(12) United States Patent
Ben-Dor

(10) Patent No.: US 10,036,146 B2
(45) Date of Patent: Jul. 31, 2018

(54) MULTIPLE AXIS HANDLE AND MECHANISM

(71) Applicant: Eran Ben-Dor, Kochav Yair-Tsur-Yigai (IL)

(72) Inventor: Eran Ben-Dor, Kochav Yair-Tsur-Yigai (IL)

(*) Notice: Subject to any disclaimer, the term of this patent is extended or adjusted under 35 U.S.C. 154(b) by 30 days.

(21) Appl. No.: 15/225,843

(22) Filed: Aug. 2, 2016

(65) Prior Publication Data

US 2016/0340878 A1     Nov. 24, 2016

Related U.S. Application Data

(63) Continuation of application No. 14/237,358, filed as application No. PCT/IL2012/050305 on Aug. 9, 2012, now Pat. No. 9,411,358.

(60) Provisional application No. 61/521,774, filed on Aug. 10, 2011.

(51) Int. Cl.
| | |
|---|---|
| *E03C 1/04* | (2006.01) |
| *G05G 1/04* | (2006.01) |
| *G05G 7/02* | (2006.01) |
| *G05G 9/047* | (2006.01) |
| *F16K 31/60* | (2006.01) |
| *F16K 11/078* | (2006.01) |

(52) U.S. Cl.
CPC ........ *E03C 1/0412* (2013.01); *F16K 11/0782* (2013.01); *F16K 31/605* (2013.01); *G05G 1/04* (2013.01); *G05G 7/02* (2013.01); *G05G 9/047* (2013.01); *Y10T 74/20612* (2015.01)

(58) Field of Classification Search
CPC ........ G05G 1/04; G05G 9/047; F16K 31/605; F16K 11/0782; E03C 1/0412

USPC .......................................... 74/523; 137/625.4
See application file for complete search history.

(56) References Cited

U.S. PATENT DOCUMENTS

| | | | | |
|---|---|---|---|---|
| 1,693,758 | A | * 12/1928 | Hennessey | F16K 11/18 137/360 |
| 2,575,305 | A | * 11/1951 | Stryzakoski | F16K 11/185 137/607 |
| 2,845,949 | A | * 8/1958 | Parker | F16K 11/087 137/605 |

(Continued)

FOREIGN PATENT DOCUMENTS

| | | |
|---|---|---|
| DE | 35 10 351 | 7/1986 |
| DE | 44 43 123 | 6/1996 |

(Continued)

OTHER PUBLICATIONS

Search Report of International Application PCT/IL2012/050305 dated Jan. 7, 2013.

(Continued)

*Primary Examiner* — Matthew W Jellett
*Assistant Examiner* — Christopher Ballman
(74) *Attorney, Agent, or Firm* — Pearl Cohen Zedek Latzer Baratz LLP

(57) ABSTRACT

A control mechanism for manually adjusting a plurality of control parameters, the control mechanism including a mechanical multiple axis handle movable about three axes of rotation for operating an operated device, wherein each of the axes of rotation pass through the handle, and a movement transformation assembly to transform rotational movements of the handle to control commands to the operated device.

16 Claims, 25 Drawing Sheets

(56) References Cited

U.S. PATENT DOCUMENTS

| | | | | |
|---|---|---|---|---|
| 2,887,128 | A * | 5/1959 | Bloomberg | F16K 11/18 137/597 |
| 3,958,601 | A * | 5/1976 | Schmitt | F16K 11/0782 137/636.2 |
| 4,375,225 | A * | 3/1983 | Andersson | F16K 11/0782 137/625.17 |
| 4,838,304 | A * | 6/1989 | Knapp | F16K 11/0782 137/454.6 |
| 4,960,154 | A * | 10/1990 | Dagiantis | F16K 11/0787 137/597 |
| 5,755,261 | A * | 5/1998 | Fukuzawa | C08L 71/00 137/625.17 |
| 8,820,705 | B2 * | 9/2014 | Davidson | E03C 1/055 137/606 |
| 2006/0108267 | A1 * | 5/2006 | Warren | B01D 27/005 210/87 |
| 2008/0128035 | A1 * | 6/2008 | Fleischmann | E03C 1/04 137/625.41 |
| 2009/0255599 | A1 * | 10/2009 | Bolgar | F16K 11/0787 137/625 |
| 2011/0100478 | A1 * | 5/2011 | Allen | F16K 31/602 137/15.01 |
| 2011/0100491 | A1 * | 5/2011 | Zhirkevich | F16K 11/076 137/625.4 |
| 2012/0042956 | A1 * | 2/2012 | Ben-Dor | F16K 31/605 137/1 |

FOREIGN PATENT DOCUMENTS

| | | |
|---|---|---|
| DE | 10 2009 001444 | 9/2010 |
| GB | 2 144 521 | 3/1985 |
| JP | 57-43566 | 7/2015 |
| JP | 58-43566 | 1/2016 |
| JP | 60-53292 | 12/2016 |

OTHER PUBLICATIONS

Supplementary European Search Report of Application No. EP 12 82 1646 dated Jun. 1, 2016.

* cited by examiner

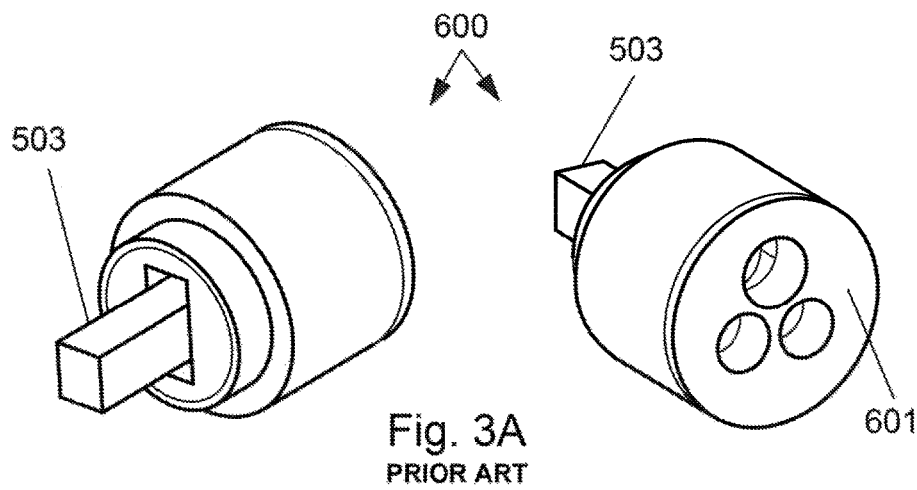
Fig. 3A
PRIOR ART
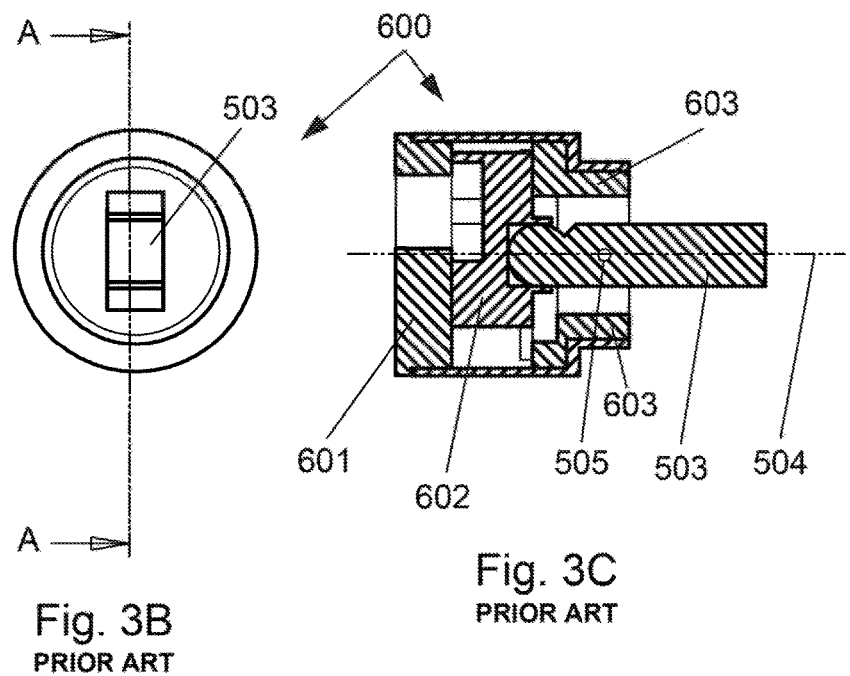
Fig. 3B
PRIOR ART
Fig. 3C
PRIOR ART

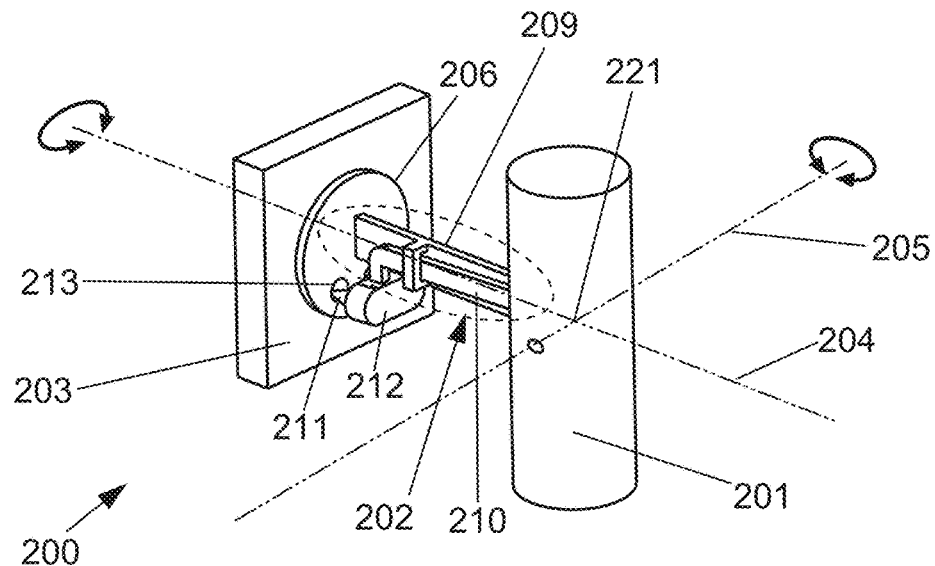
Fig. 5A
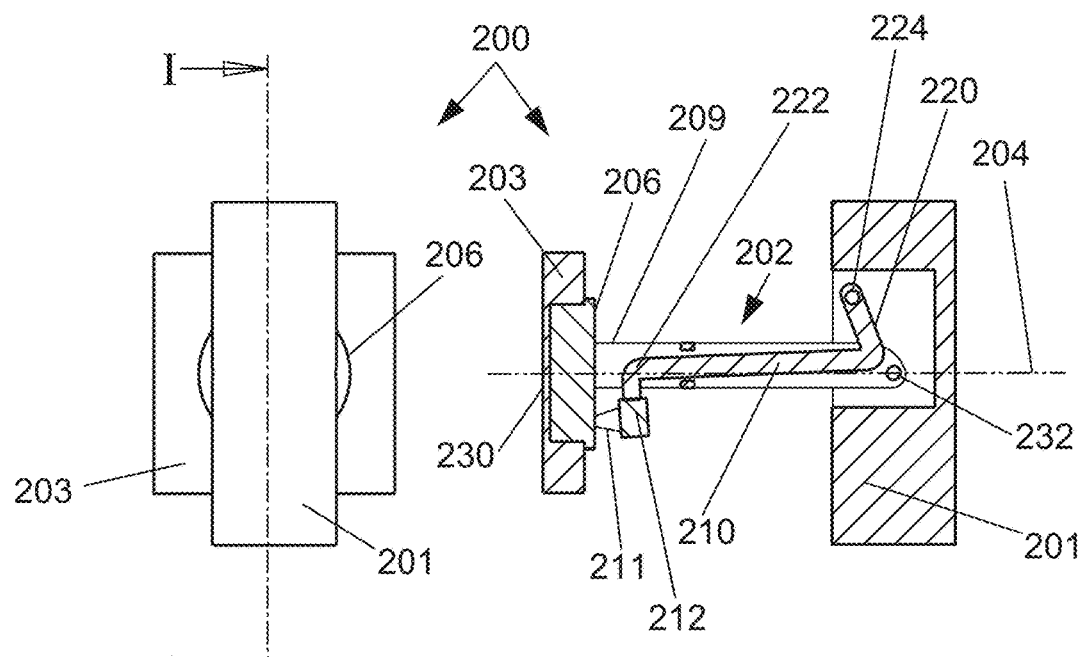
Fig. 5B
Fig. 5C

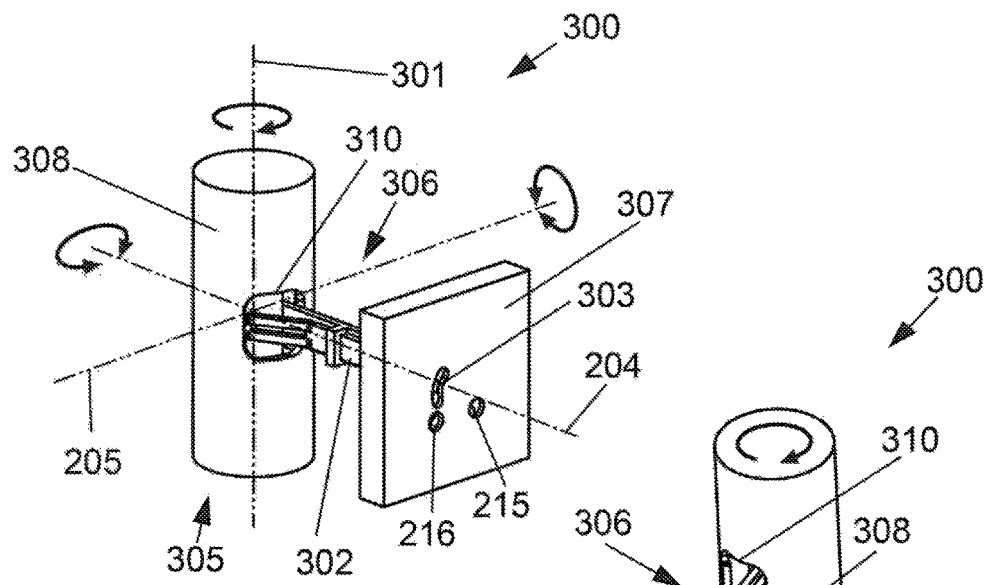
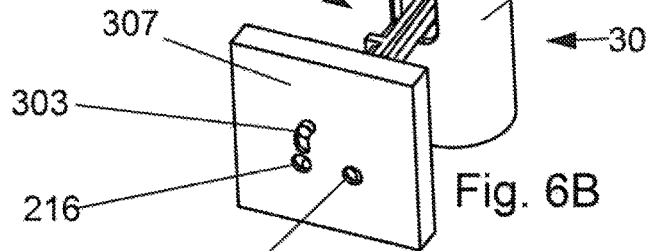
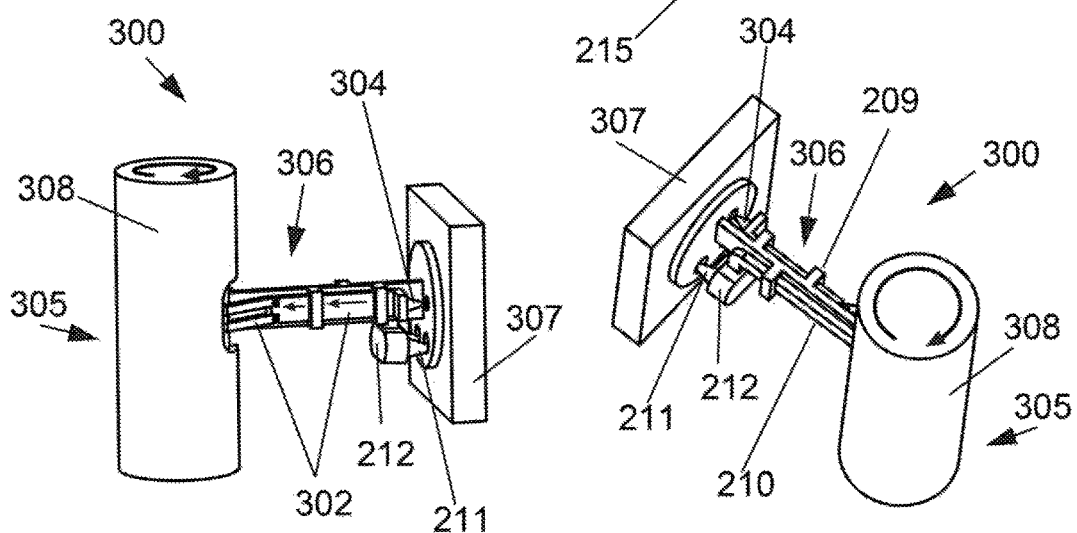
Fig. 6A  Fig. 6B  Fig. 6C  Fig. 6D

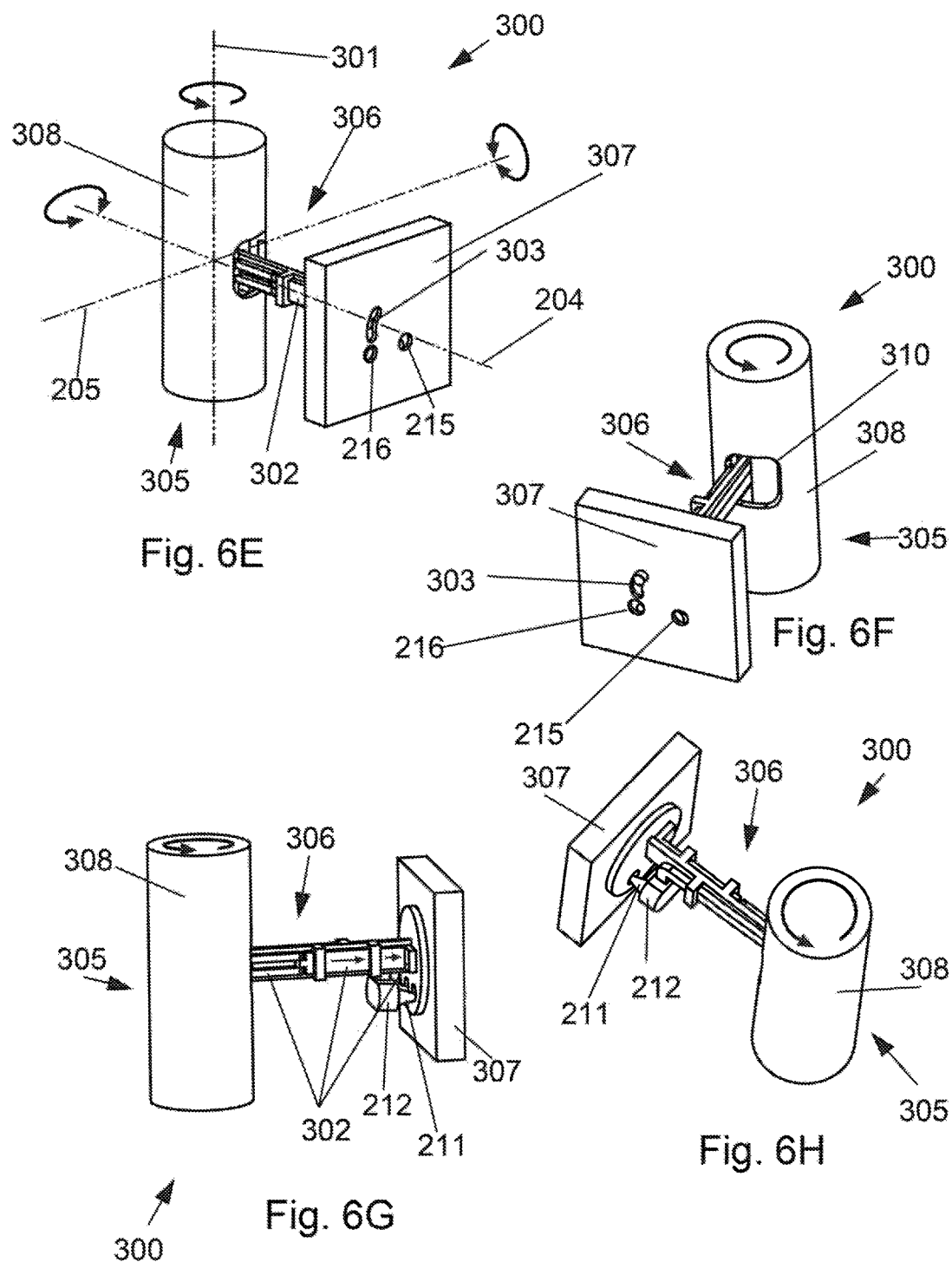

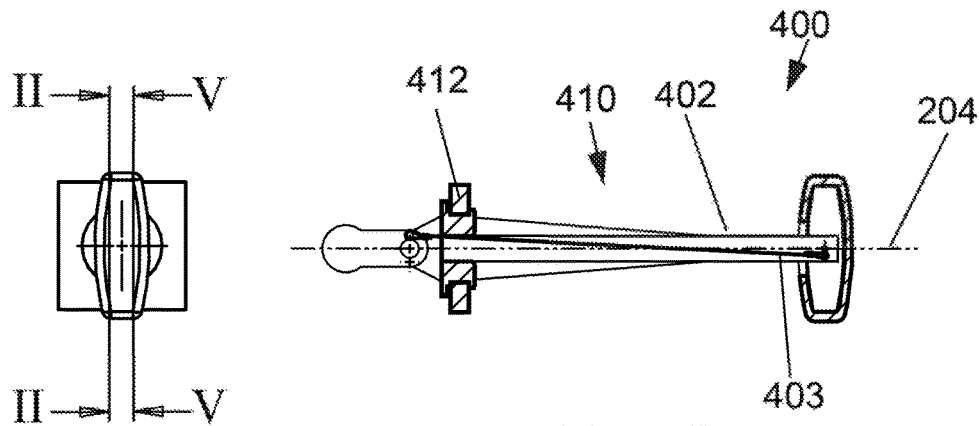
Fig. 7E
Fig. 7F
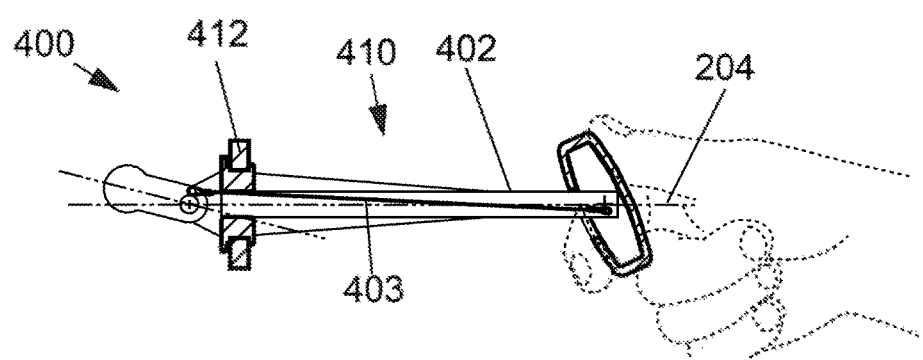
Fig. 7G
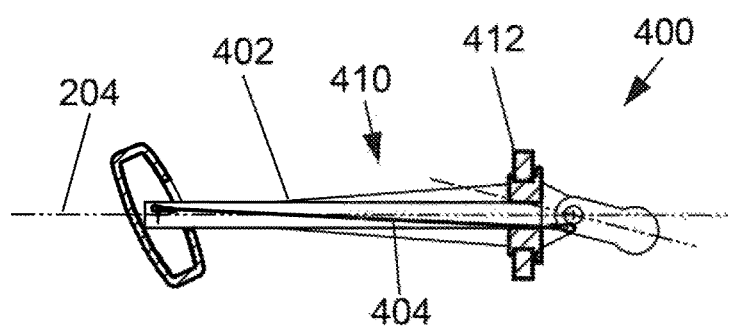
Fig. 7H

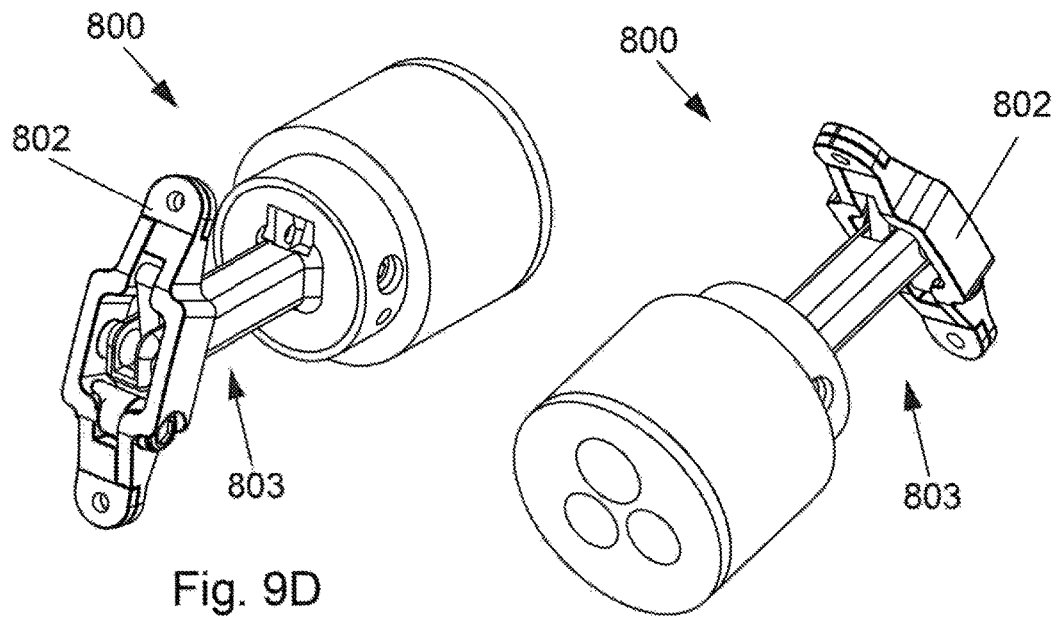
Fig. 9D
Fig. 9E
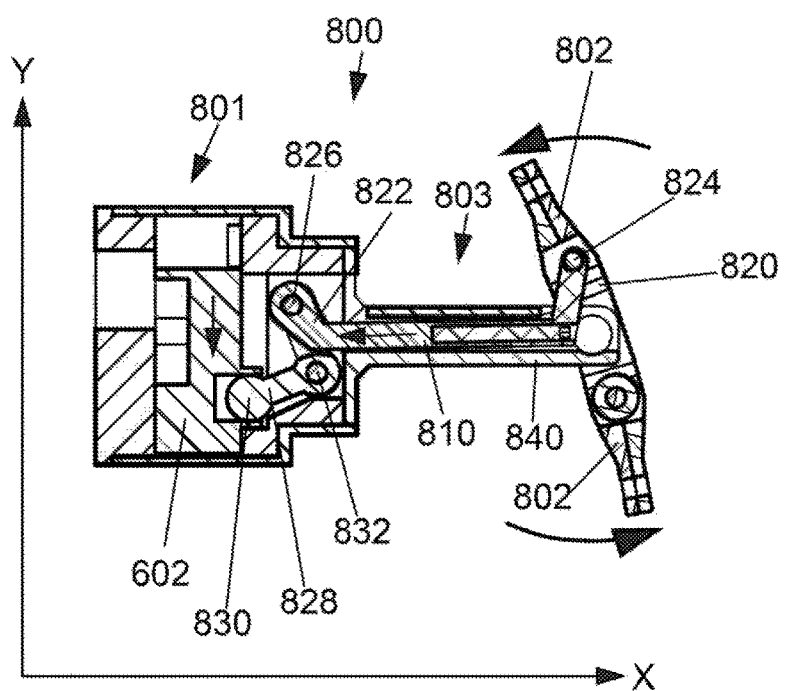
Fig. 9F

MULTIPLE AXIS HANDLE AND MECHANISM

CROSS REFERENCE TO RELATED APPLICATIONS

This application is a Continuation of U.S. patent application Ser. No. 14/237,358, filed on Feb. 6, 2014, which application is a U.S. National Phase Application of International Patent Application No. PCT/IL2012/050305, filed Aug. 9, 2012, published as WO 2013/021388 on Feb. 14, 2013, and which claims the benefit of U.S. Provisional Patent Application No. 61/521,774, filed Aug. 10, 2011, each of which is incorporated by reference in its entirety.

BACKGROUND OF THE INVENTION

Multiple axis control handles exist today. However, operating common multiple axis control handles that are in use today, such as an operating handle of single lever mixer faucets, is done by using primarily the arm and forearm that are operated primarily by using the arm muscles and shoulder muscles via the elbow joint and shoulder joint. Such movements are defined as gross motor skill type movements. Gross motor skill type movements make it hard for the user to perform fine adjustments while operating such handles.

Gentle motor skill type movements are performed by small body parts such as the hand and fingers. Typically, gentle motor skill movements take place closer to the actuated device and require shorter levers. Therefore, gentle motor skill type movements may give the user better control over fine adjustments.

Prior art multiple axis handles typically require gross motor skill type movements. It may be difficult for the user to perform fine adjustments while operating such handles.

Reference is now made to FIGS. 1A, 1E and 1F, which are schematic illustrations of a prior art single lever mixer faucet 500 including a prior art handle 501, to FIG. 1B which is an exploded view of parts of faucet 500, and to FIGS. 1C and 1D which the schematic illustrations of faucet 500 without handle 501. A mixer faucet 500 may include two inlets for water 510, 512. Typically one inlet e.g., inlet 512, is for cold water and the other, e.g., inlet 510, is for hot water. Mixer faucet 500 may be designed to mix the water that enters from the two different inlets 510, 512 and let the water exit from one outlet 514. Single lever mixer faucet 500 may include a cartridge 600 that may set the water flow strength and the relative mixture of cold and hot water. The cartridge's lever 503 may rotate about two axes of rotation 504 and 505. Axis of rotation 505 is at the lever's base, and the lever swings around it as a clock's pointer. Axis of rotation 504 is perpendicular to axis of rotation 505. FIG. 1D demonstrates rotation of lever 503 about axis of rotation 504, and FIG. 1C demonstrates rotation of lever 503 about axis of rotation 505.

In order to control cartridge 600, the user uses a lever handle 501 that is operatively connected to lever 503 of cartridge 600. When cartridge 600 is installed at a vertical orientation, as illustrated in FIG. 1B, the standard lever handle 501 extends from it in a way that moving the handle's tip 506 up will rotate the faucet cartridge's lever 503 around the cartridge's axis of rotation 505, increasing the water flow rate, and moving the tip 506 down will decrease the water flow rate. FIG. 1E demonstrates rotation of handle 501 about axis of rotation 505. Moving the handle's tip 506 to the direction of the inlet 512 of the cold water will rotate the faucet cartridge's lever 503 around its axis of rotation 504, increasing the relative amount of cold water vis a vis hot water, and moving it to the direction of the inlet 510 of the hot water will increase the relative amount of hot water vis a vis cold water. FIG. 1F demonstrates rotation of handle 501 about axis of rotation 504. Moving the handle tip 506 all the way down will shut down the water flow that comes out of faucet 500.

Thus, the operation of cartridge 600 of faucet 500 may require a complex movement in two axes, e.g., up/down for flow strength, and left/right for temperature adjustments. Cartridge 600, illustrated in FIG. 1B installed vertically, can be installed in faucets and other kind of plumbing installations in different orientations, and the orientation of the operation of handle 501 will change respectively.

Operating the standard lever handle 501 requires the operator to perform gross motor skill type movements, using the elbow and shoulder joints as illustrated at FIGS. 2A, 2B, 2C, 2D, 2E and 2F. In FIG. 2A, handle 501 is at base state, at horizontal orientation. In FIG. 2B, handle 501 is at horizontal orientation, rotated about axis of rotation 505. In FIG. 2C, handle 501 is at base state, at vertical orientation. In FIG. 2D, handle 501 is at vertical orientation, rotated about axis of rotation 505. In FIG. 2E, is at base state, while in FIG. 2F, handle 501 is rotated about axis of rotation 504. When gross motor skill type movements are used to operate handle 501, it is hard to perform delicate and precise adjustments to the faucet's cartridge 600. As a result, the common characteristics of using such faucets are:

The user may lift and turn the handle's tip 506 in order to turn on the water flow to a desirable strength and temperature. Due to the difficulty to predict the results, based on a gross motor skill type movement, the user then observes and tests the results, trying to decide how close it is to his desire and need. In some cases, the preliminary operation will result in a stronger or weaker flow, and the water temperature would be warmer or colder than what the user needs. Because of that, until the user manages to adjust the flow's strength and temperature, water and time are wasted.

In the next stage, the user may try to perform adjustments to the water flow rate and temperature. Here again, the difficulty to perform delicate and precise adjustments will sometimes result in a series of overshooting and undershooting adjustments. The longer this procedure takes, the more annoying it will be and the more water will be wasted.

At a certain stage, the user will stop the adjustments attempts. In some cases, it will be after he achieved the approximate result he needed. In other cases, it will be after he gave up the possibility to achieve the desired result. Regarding the temperature of the water, the user will then compromise for a water flow that is a bit warmer or colder then what he wanted, which will be a bit uncomfortable or unpleasant. Regarding the water flow rate, on the other hand, the user will compromise for a water flow that is a bit stronger or a bit weaker than what he needs. Using a water flow that is weaker than what the user needs will sometimes prevent the user from performing his task properly, such as comfortably and efficiently washing his hands, taking a shower, etc. A stronger water flow, on the other hand, will enable, in most cases, the user to perform his task in a sufficient way, even if the conditions are not optimal for him, so, in most cases, the user will prefer to settle for a water flow that is a bit stronger than what he meant than using a water flow that is too weak. In cases like this, water is wasted because the same task could have been performed in the same duration but with a weaker water flow, and, therefore, less water would have been used to perform the same task.

Further discussion of gross motor skill type movements required for operating prior art lever handle 501 is provided in US Patent Application Publication No. 2012/0042956 to the applicant of the present application, which is incorporated in its entirety herein by reference.

Reference is now made to FIGS. 3A and 3D, which are schematic illustrations of prior an cartridge 600 of faucet 500, to FIG. 3B, which is a front view of cartridge 600, and to FIGS. 3C and 3E, which are cross sectional views of cartridge 600 along axis A-A, marked on FIG. 3B. In FIGS. 3D and 3E, lever 503 of cartridge 600 is rotated about axis of rotation 505. Lever 503 of cartridge 600 may be tilted about axis of rotation 505, which is perpendicular to the plain A-A. As a result, a movable plate element 602, which is normally designed as an assembly of different pans that work together and thus are illustrated here as one part, may slide over the base static plate 601 which is also normally designed as an assembly of different parts that works together and are thus illustrated here as one part, to set the water flow rate. Rotating the cartridge's lever 503, which is also normally designed as a lever assembly of lever 503 and a base block 603, about axis of rotation 504 rotates movable plate 602 with relation to base static plate 601 to set the relative mixture of cold and hot water. Movable plate 602 and base static plate 601 may be made of ceramic material or include ceramic parts. Additionally or alternatively, parts of movable plate 602 and base static plate 601 may be made from various materials or from combinations of materials, such as plastic plates, rubber rings, Teflon cylinder, etc.

SUMMARY OF THE INVENTION

According to embodiments of the present invention, there is provided a control mechanism for manually adjusting a plurality of control parameters, the control mechanism may include: a mechanical multiple axis handle movable about a plurality of axes of rotation for operating an operated device, wherein each of the axes of rotation pass through the handle; and a movement transformation assembly to transform rotational movements of the handle to control commands to the operated device.

Furthermore, according to embodiments of the present invention, the control parameters are independent of each other.

Furthermore, according to embodiments of the present invention, the plurality of axes of rotation includes two axes of rotation.

Furthermore, according to embodiments of the present invention, the plurality of axes of rotation includes three axes of rotation.

Furthermore, according to embodiments of the present invention, the axes of rotation cross through a substantially common point located within the handle.

Furthermore, according to embodiments of the present invention, the axes of rotation pass in the middle of a longitudinal dimension of the handle.

Furthermore, according to embodiments of the present invention, the axes of rotation pass in the middle of a graspable area of the handle.

Furthermore, according to embodiments of the present invention, the axes of rotation are mutually independent.

Furthermore, according to embodiments of the present invention, the axes of rotation are substantially perpendicular to each other.

Furthermore, according to embodiments of the present invention, the handle extends to both sides of the movement transformation assembly.

Furthermore, according to embodiments of the present invention, the movement transformation assembly disposed in a tunnel.

Furthermore, according to embodiments of the present invention, the movement transformation assembly coincides with one of the axes of relation.

Furthermore, according to embodiments of the present invention, the movement transformation assembly may transform rotational movements of the handle into a movement type selected from the list including: linear movement, pivotal movement and rotational movement.

Furthermore, according to embodiments of the present invention, the operated device is a cartridge of a faucet.

Furthermore, according to embodiments of the present invention, the cartridge may include a mechanism to set at least two controlled parameters related to the operation of the faucet.

Furthermore, according to embodiments of the present invention, the cartridge may include at least one mechanism to set the relative mixture of hot and cold water and at least one mechanism to set the overall water flow rate of the faucet.

Furthermore, according to embodiments of the present invention, the cartridge may include: a base static plate; a movable plate movable over the base static plate; and a lever assembly including a lever and a base block, operatively connected to the movable plate element wherein rotating the lever and the base block about a first lever axis of rotation may rotate the movable plate over the static plate to set the first control parameter, and tilting the lever about a second lever axis of rotation may slide the movable plate over the base static plate to set the second control parameter, wherein the plurality of axes of rotation comprises a first axis of rotation and a second axis of rotation, and wherein the movement transformation assembly to transform rotation of the handle about the first axis of rotation to the rotation of the base block that rotates the movable plate, and to transform rotation of handle about the second axis of rotation to the tilt of the lever that slides the movable plate over the static plate.

Furthermore, according to embodiments of the present invention, the movement transformation assembly may include: a rocker; a member to transfer rotational movements of the handle about the first axis of rotation to control commands to the cartridge, the member anchored to the handle and fixed to the base block, the member to rotate the base block when the handle is rotating about the first axis of rotation; and an elongated rod to transfer rotational movements of the handle about the second axes of rotation to control commands to the cartridge, the rod may be anchored at one end to the handle at a distance from the second axis of rotation such that when the handle rotates about the second axis of rotation the elongated rod moves substantially towards or away from the cartridge, and the second end of the rod may be anchored to an end of the rocker, the second end of the rocker is anchored to the lever, and the rocker may be anchored to the member, such that when the rod moves towards or away from the cartridge the rocker tilts the lever.

Furthermore, according to embodiments of the present invention, the cartridge may include: a base static plate; a movable plate movable over the base static plate, wherein rotating the movable plate over the base static plate sets the first control parameter, and sliding the movable plate over the base static plate sets the second control parameter; and a base block fixed to the movable plate; wherein the plurality of axes of rotation comprises a first axis of rotation and a second axis of rotation, and wherein the movement transformation assembly may transform rotation of the handle about the first axis of rotation to the rotation of the base block that rotates the movable plate, and to transform rotation of handle about the second axis of rotation to sliding of the movable plate over the static plate.

Furthermore, according to embodiments of the present invention, the movement transformation assembly may include: a rocker; a member to transfer rotational movements of the handle about the first axis of rotation to control commands to the cartridge, the member anchored to the handle and fixed to the base block, the member to rotate the base block when the handle is rotating about the first axis of rotation; an elongated rod to transfer rotation movements of the handle about the second axis of rotation to control commands to cartridge, the rod anchored to the handle at a distance from the second axis of rotation such that when the handle rotates about the second axis of rotation the elongated rod moves substantially back and forth relatively to the cartridge, the second end of the rod is anchored to the rocker, the second end of the rocker is anchored to the plate and the rocker is anchored to the member, such that when the rod moves towards or away from the cartridge, the rocker slides the movable plate over the static plate.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3A is a schematic illustration of a prior art cartridge of faucet the prior art single lever mixer faucet depicted in FIG. 1A;

FIG. 3B is a schematic front view of the prior an cartridge depicted in FIG. 3A;

FIG. 3C is a cross sectional view of the prior art cartridge depicted in FIG. 3A along axis A-A;

FIG. 5A is a schematic 3D illustration of a double axis control mechanism according to embodiments of the present invention, with the handle in a middle position;

FIG. 5B is a schematic front view of the double axis control mechanism depicted in FIG. 5A;

FIG. 5C is a schematic cross section illustration of the double axis control mechanism depicted in FIG. 5A along section plane I-I;

FIG. 6A is a schematic 3D illustration of a triple axis control mechanism according to some embodiments of the present invention, with the handle rotated about a third axis of rotation to a first direction;

FIG. 6B is a schematic 3D illustration of the triple axis control mechanism depicted in FIG. 6A from a different angle, with the handle rotated about the third axis of rotation to a first direction;

FIG. 6C is a schematic 3D illustration of the triple axis control mechanism depicted in FIG. 6A from a different angle, with the handle rotated about the third axis of rotation to a first direction;

FIG. 6D is a schematic 3D illustration of the triple axis control mechanism depicted in FIG. 6A from a different angle, with the handle rotated about the third axis of rotation to a first direction;

FIG. 6E is a schematic 3D illustration of the triple axis control mechanism depicted in FIG. 6A, with the handle rotated about the third axis of rotation to a second direction;

FIG. 6F is a schematic 3D illustration of the triple axis control mechanism depicted in FIG. 6A from a different angle, with the handle rotated about the third axis of rotation to a second direction;

FIG. 6G is a schematic 3D illustration of the triple axis control mechanism depicted in FIG. 6A from a different angle, with the handle rotated about the third axis of rotation to a second direction;

FIG. 6H is a schematic 3D illustration of the triple axis control mechanism depicted in FIG. 6A from a different angle, with the handle rotated about the third axis of rotation to a second direction;

FIG. 7E is a schematic front view of the double axis control mechanism depicted in FIG. 7A;

FIG. 7F is a schematic cross section illustration of the double axis control mechanism depicted in FIG. 7A along section plane II-II;

FIG. 7G is a schematic cross section illustration of the double axis control mechanism depicted in FIG. 7A along section plane II-II, with the handle rotated about the second axis of rotation;

FIG. 7H is a schematic cross section illustration of the double axis control mechanism depicted in FIG. 7A along section plane V-V, with the handle rotated about the second axis of rotation;

FIG. 9D is a schematic 3D illustration of the double axis control mechanism depicted in FIG. 9A, with the handle rotated about the second axis of rotation;

FIG. 9E is a schematic 3D illustration of the doable axis control mechanism depicted in FIG. 9A, with the handle rotated about the second axis of rotation;

FIG. 9F is a schematic cross section illustration of the double axis control mechanism depicted in FIG. 9A along section plane IV-IV, with the handle rotated about the second axis of rotation;

Figure 1A:
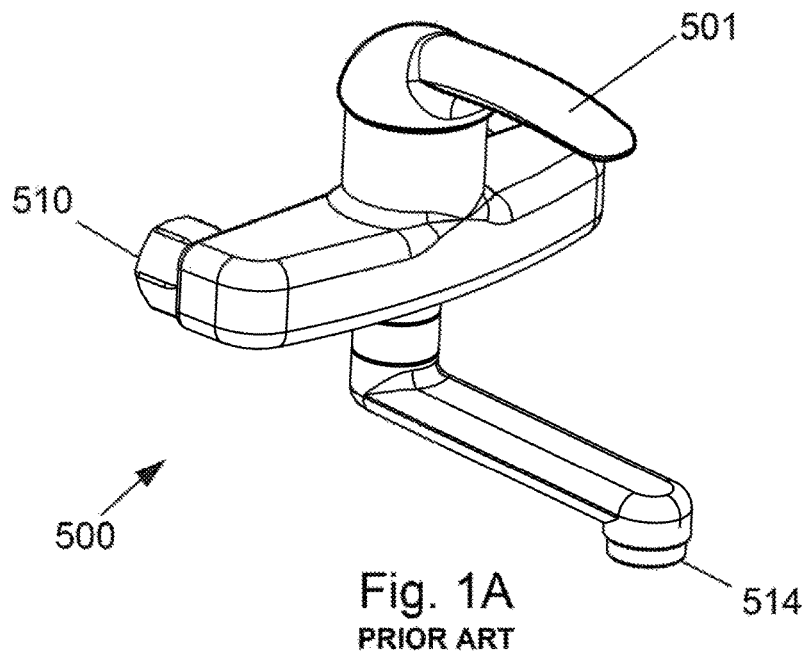
FIG. 1A is a schematic illustration of a prior art single lever mixer faucet including a prior art handle.
Figure 1B:
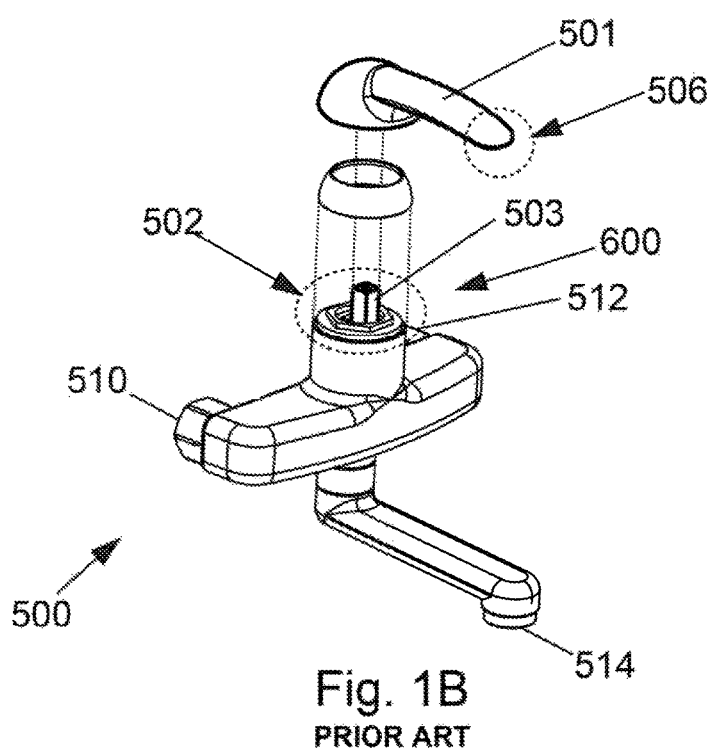
FIG. 1B is an exploded view of pans of the prior art single lever mixer faucet depicted in FIG. 1A.
Figure 1C:
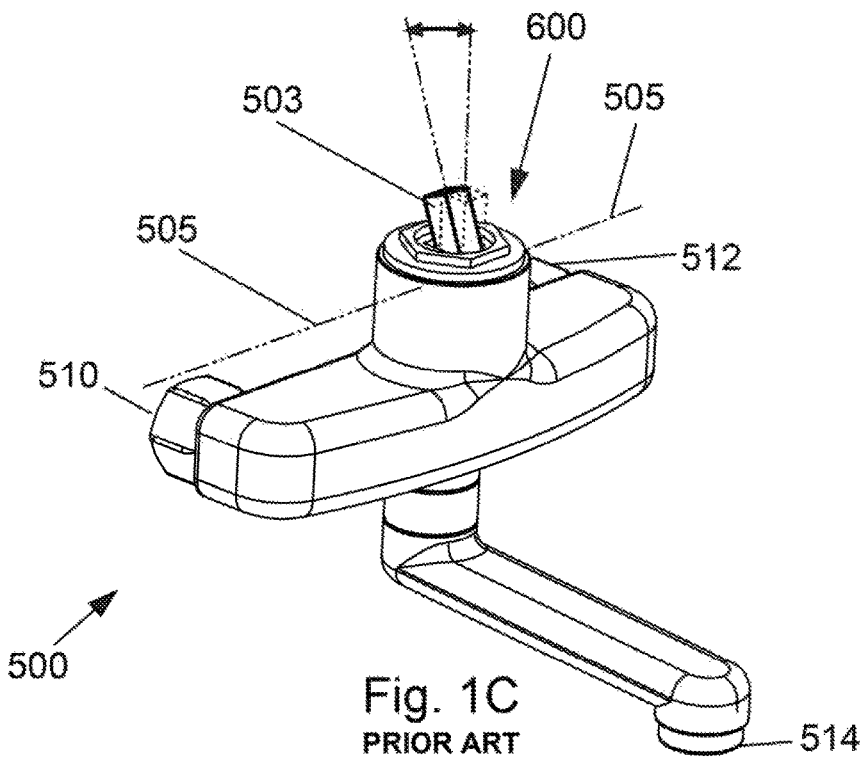
FIG. 1C is a schematic illustration of the prior art single lever mixer faucet depicted in FIG. 1A without the handle, demonstrating rotation of the lever of the cartridge about a second axis of rotation.
Figure 1D:
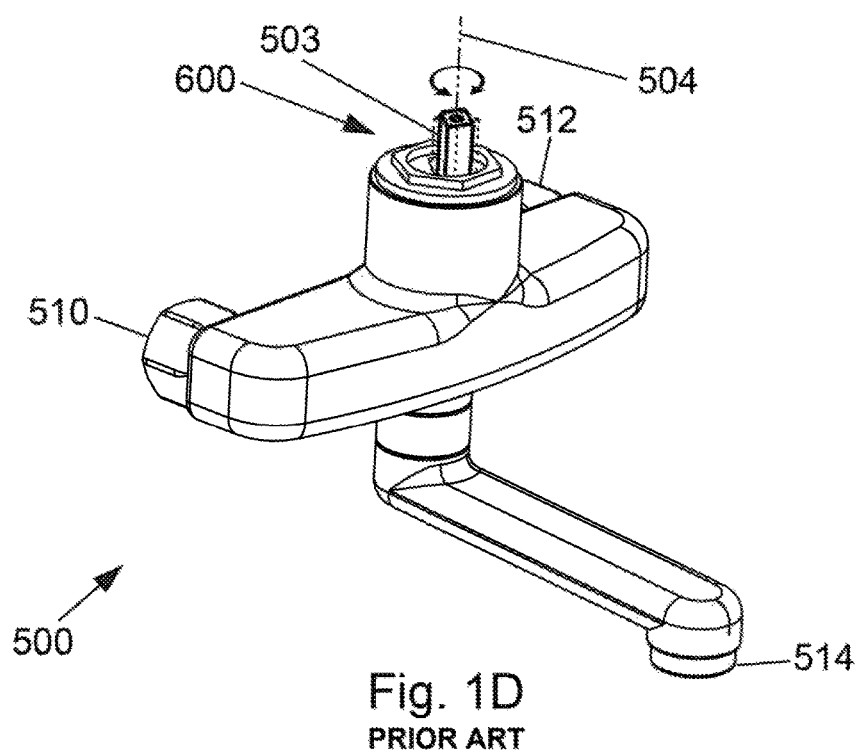
FIG. 1D is a schematic illustration of the prior art single lever mixer faucet depicted in FIG. 1A without the handle, demonstrating rotation of the lever of the cartridge about a first axis of rotation.
Figure 1E:
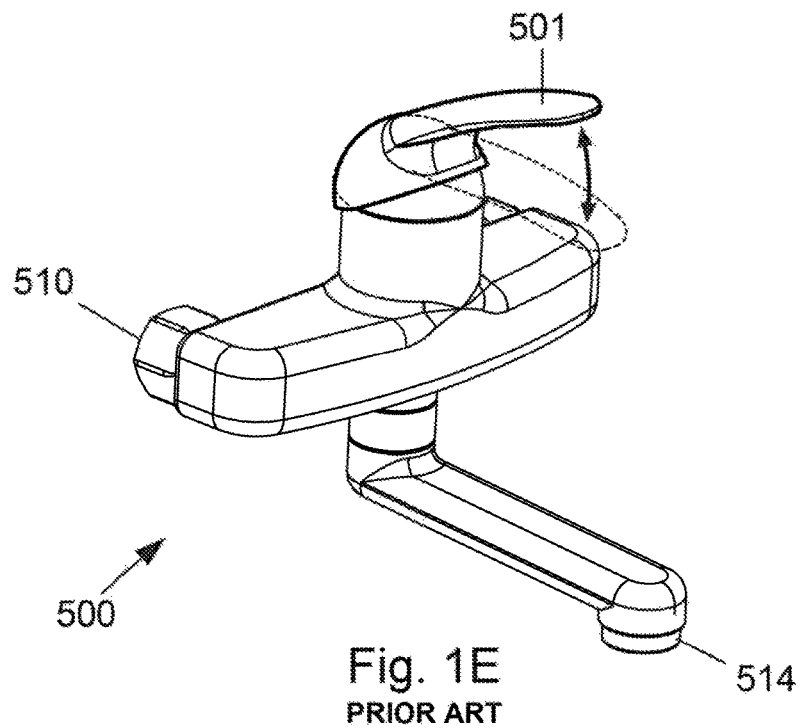
FIG. 1E is a schematic illustration of the prior art single lever mixer faucet depicted in FIG. 1A, demonstrating rotation of the handle about the second axis of rotation.
Figure 1F:
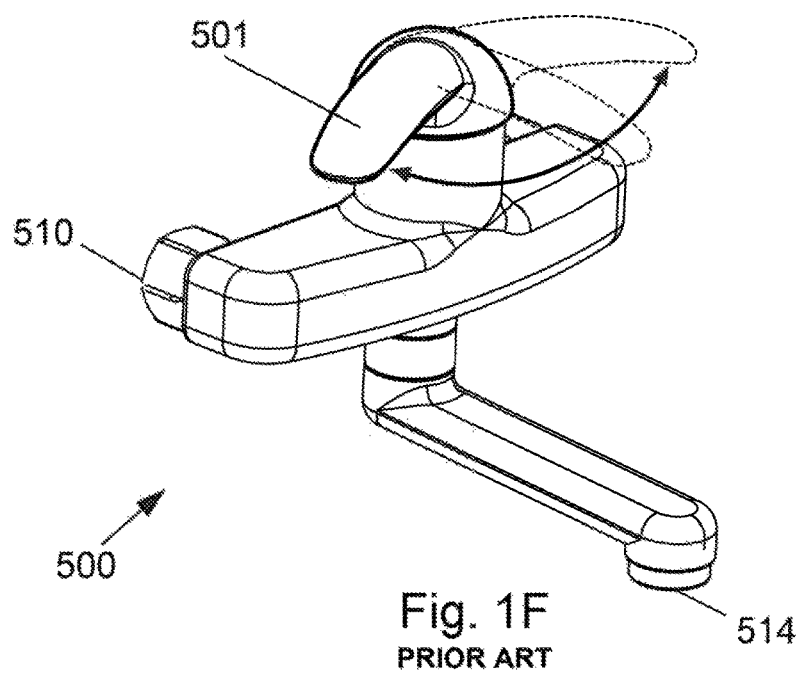
FIG. 1F is a schematic illustration of the prior art single lever mixer faucet depicted in FIG. 1A, demonstrating rotation of the handle about the first axis of rotation.
Figure 2A:
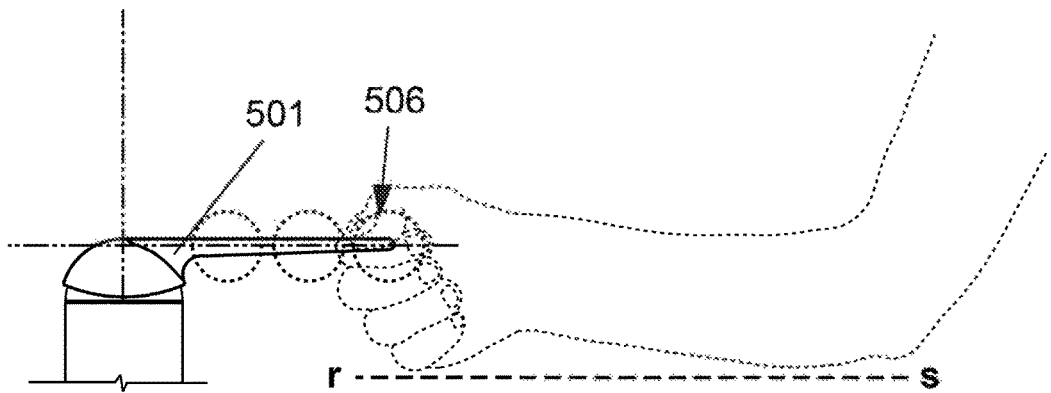
FIG. 2A demonstrates a possible way of holding the handle of live prior art single lever mixer faucet depicted in FIG. 1A when the handle is at base state, at horizontal orientation.
Figure 2B:
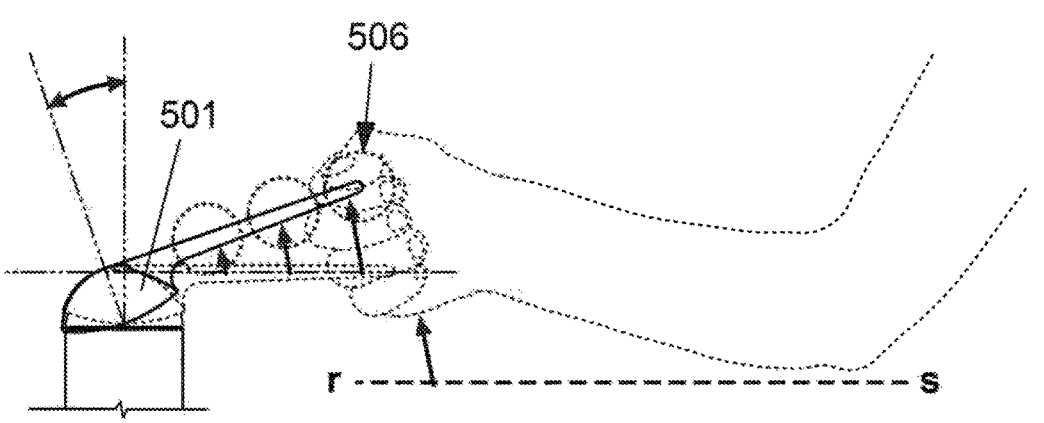
FIG. 2B demonstrates the gross motor skill type movements required to operate the prior art single lever mixer faucet depicted in FIG. 1A, for rotating the handle about a second axis of rotation, at horizontal orientation, in reference to the base state depleted in FIG. 2A.
Figure 2C:
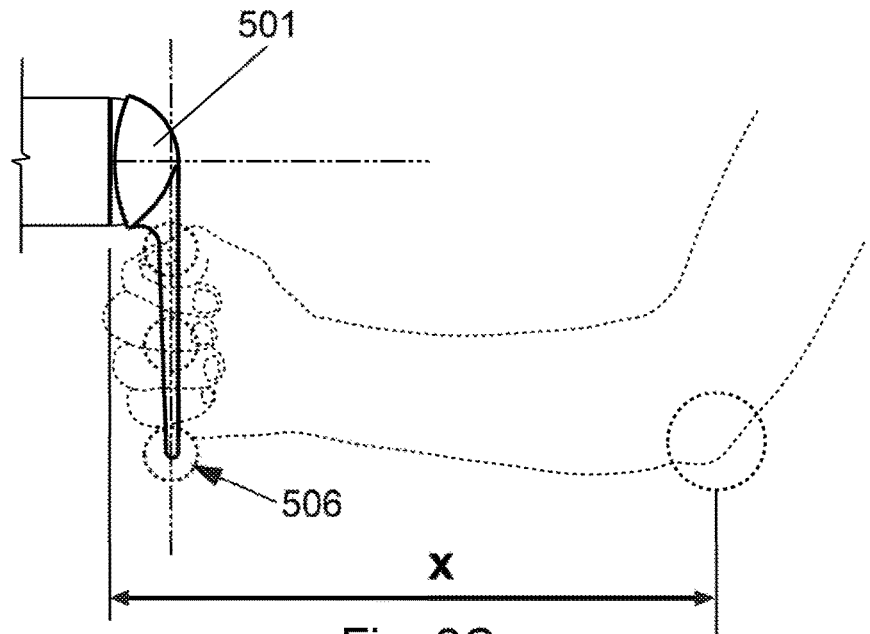
FIG. 2C demonstrates a possible way of holding the prior art single lever mixer faucet depicted in FIG. 1A, when the handle is at base state, in vertical orientation.
Figure 2D:
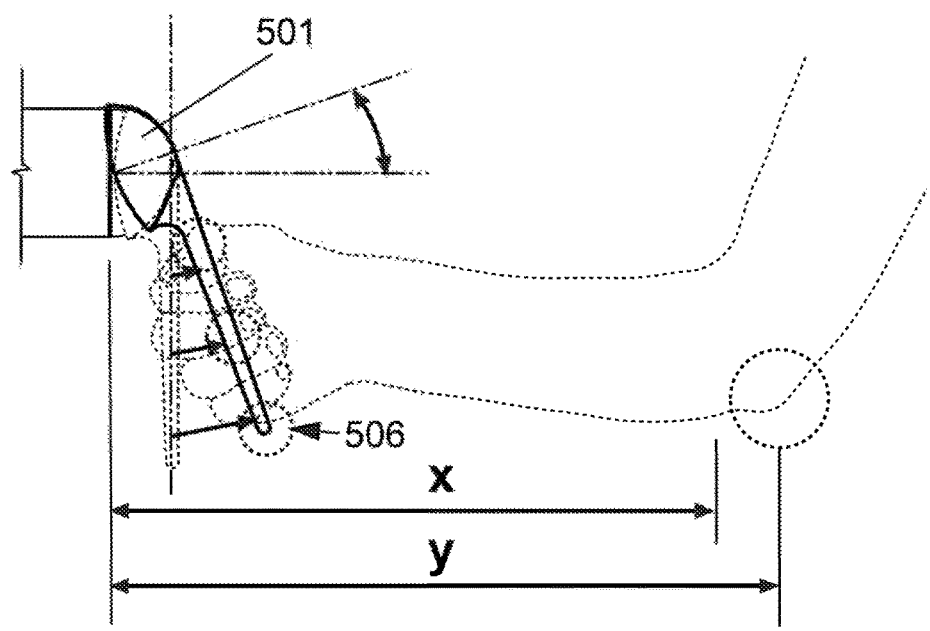
FIG. 2D demonstrates the gross motor skill type movements required to operate the prior art single lever mixer faucet depicted in FIG. 1A, for rotating the handle about a second axis of rotation, in vertical orientation, in reference to the base state depicted in FIG. 2C.
Figure 2E:
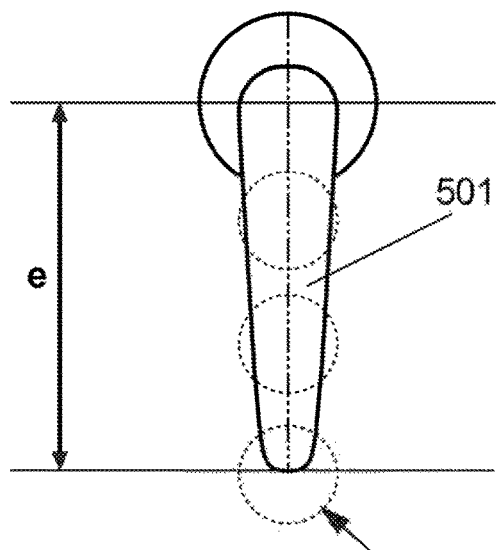
FIG. 2E demonstrates hose state of the handle of the prior art single lever mixer faucet depicted in FIG. 1A.
Figure 2F:
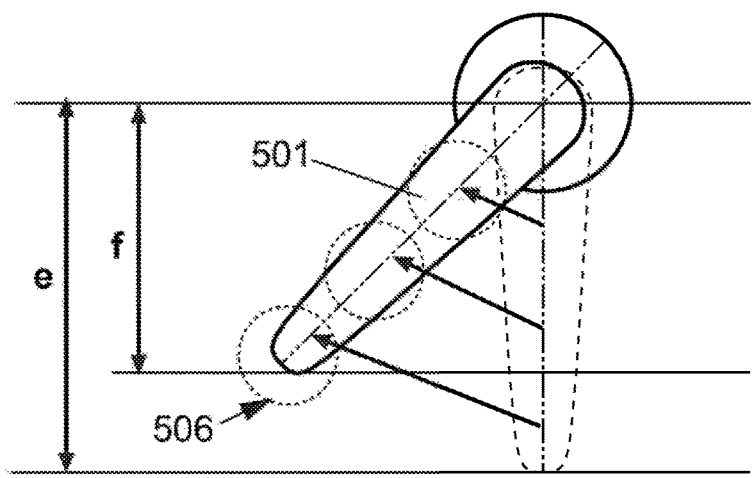
FIG. 2F demonstrates the position of the handle of the prior art single lever mixer faucet depicted in FIG. 1A when rotated about the first axis of rotation.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the present invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed at the same point in time.

According to some embodiments of the present invention, there is provided a control mechanism for manually adjusting three independent control parameters including a mechanical multiple axis handle for operating a device, and a movement transformation assembly to transform movements of the handle to control commands to the operated device. The multiple axis handle may be movable about a plurality of axes of rotation, e.g., two or three axes of rotation, such that each of the axes of rotation pass though the handle and may cross through a substantially common point, or at an area located within the handle so that the handle enables holding it on both sides of that point and the operation is carried out by turning the handle around each axis for changing a respective parameter. Typically, the movement transformation assembly may be disposed in a confined space, e.g., in a tunnel, and may coincide with one of the axes of rotation.

The handle may be operated by a user substantially using gentle motor skill type movements. A handle operated using gentle motor skill type movements may give the user a better control of the operated device when compared to a handle operated using gross motor skill type movements. Therefore, such handle may give more precise input to the operated device. The movement transformation assembly may transform the movements of the handle into specific actions preformed on or by the operated device. The movement transformation assembly according to some embodiments of the present invention may obviate using bulky and cumbersome mechanisms required for transferring control signals from the handle to the operated device.

Figure 4:
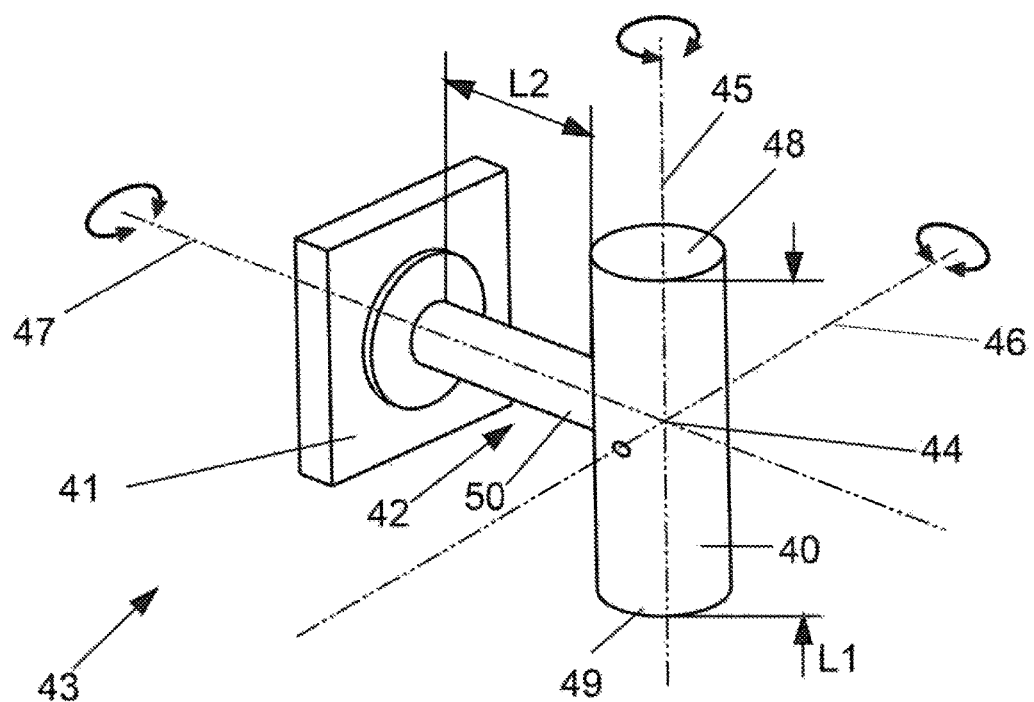
FIG. 4 is a high-level diagram of a control mechanism for manually adjusting three control parameters according to embodiments of the present invention.

Reference is now made to FIG. 4 which is a high-level diagram of a control mechanism 43 for manually adjusting three independent control parameters according to some embodiments of the present invention. According to some embodiments of the present invention, control mechanism 43 may include a multi-axes handle 40 for operating an operated device 41, and a movement transformation assembly 42 to transform movements of handle 40 into control commands to the operated device 41. Handle 40 may be rotatable about three axes of rotation 45, 46 and 47, all of which pass through handle 40. For example, axes of rotation 45, 46 and 47 may pass through handle 40 substantially in the middle of its longitudinal dimension. Axes of rotation 45, 46 and 47 may be substantially perpendicular to each other and may meet substantially at an intersection point 44 located within handle 40. Alternatively, the angle between axes of rotation 45, 46 and 47 may be other than 90 degrees. In some applications, the axes are orthogonal to each other, e.g., mutually independent, such that rotating handle 40 about one of the axes of rotation 45, 46 and 47 does not affect control parameters related to the other axes of rotation. Axes of rotation 45, 46 and 47 may lie in different and separated flat plans.

It should be noted that rotating handle 40 about axis of rotation 46 may change the angle between the axes of rotation 47 and 45 to different angles. In the rotated positions, there are still two pairs of substantially perpendicular axes: 46 and 47 on one hand and 46 and 45 on the other hand. Each axis of rotation will be substantially perpendicular to all others axes of rotation only at a specific position and only if the handle wax designed to have this specific position.

Rotation of handle 40 about each one of axes of rotation 45, 46 and 47 may adjust a respective and separate control parameter, e.g., rotation of handle 40 about axis of rotation 45 may adjust a first control parameter, rotation of handle 40 about axis of rotation 46 may adjust a second control parameter and rotation of handle 40 about axis of rotation 47 may adjust a third control parameter.

Device 41 may include any device operated by adjusting a plurality of control parameters. For example, device 41 may include a device operated by multiple axes handles. Device 41 may be mechanical electrical or virtual device, with appropriate movement transformation assembly 42.

Figure 3D:
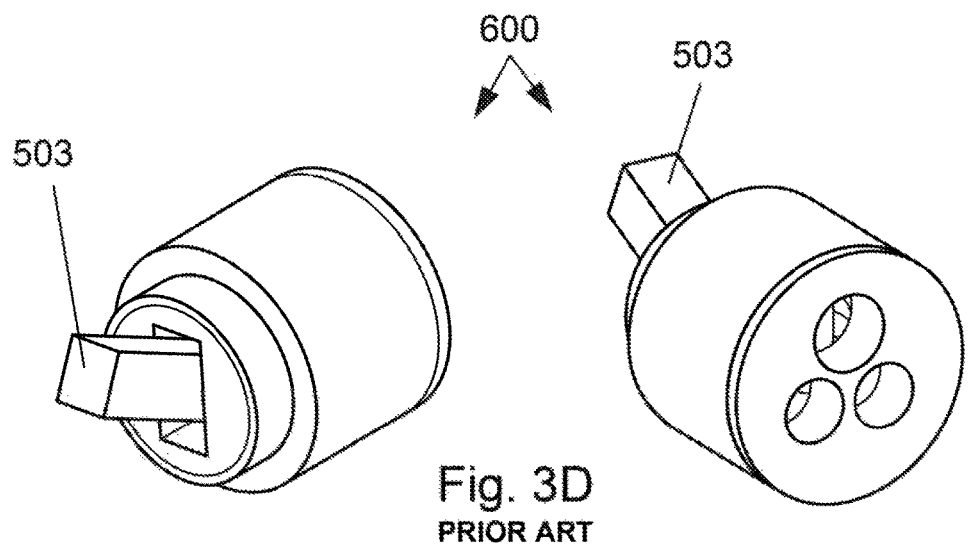
FIG. 3D is a schematic illustration of the prior art cartridge depicted in FIG. 3A, with the lever of the cartridge rotated about a second axis of rotation.
Figure 3E:
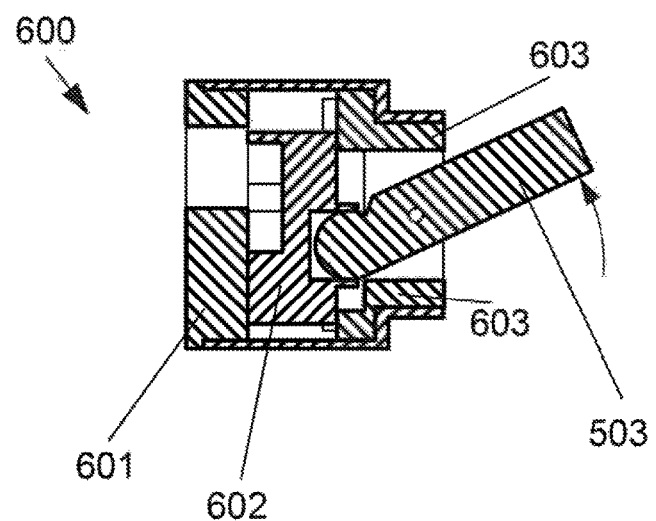
FIG. 3E is a cross sectional view of the prior art cartridge depicted in FIG. 3A along axis A-A, with the lever of the cartridge rotated about the second axis of rotation.

According to some embodiments of the present invention, operated device 41 may include a cartridge of a faucet. For example, the cartridge may include one or more mechanisms to set at least two controlled parameters related to the operation of the faucet. For example, the controlled parameters may include the relative mixture of hot and cold water and the overall water flow rate of the faucet. For example, operated device 41 may include a mixer cartridge that includes at least one mechanism to set the relative mixture of hot and cold water and at least one mechanism aimed to set the overall water flow rate of the faucet. In some embodiments, operated device 41 may include a cartridge that docs not include a mixer, for example, a cartridge that sets the water flow rate and controls the rate of water pulses, for example, water pulses that are meant to massage the body, etc. The cartridge may include plate valve, for example, as base plate 601, and movable plate 602, of cartridge 600 depicted in FIG. 3C, or any other suitable mechanism used for controlling the flow rate, the mixing of cold and hot water or any other parameter, as may be required.

Handle 40 may have any suitable shape, form or size to match different system and user needs. For example, handle 40 may be shaped as a ball, flat round disc, cylinder, ergonomic hand-like shape, etc. Handle 40 may extend to both sides of movement transformation assembly 42.

The size of handle 40 may vary to fit different applications. For example, the length of handle 40, marked as L1, may be around 8-10 cm. That length may enable an adult user to fully grasp handle 40 with the palm of his hand, for example, by placing two fingers at each side of handle 40 extending from movement transformation assembly 42. Thus, intersection point 44 of axes 45, 46 and 47 may be at or close to the center of handle 40 that is at or close to the midpoint of longitudinal axis 46, in substantially equal distances from ends 48 and 49. As a result, the graspable area may be located such that intersection point 44 lies within the closed fist of the grasping hand and a user may operate handle 40 using gentle motor skill type movements. According to some embodiments of the present invention, axes of rotation 45, 46 and 47 may intersect in two slightly apart intersection points, or even not intersect at all, yet, according to some embodiments of the present invention, each of rotation axes 45, 46 and 47 crosses through handle 40, thus preserving the feature described above which enable operation each of the controlled parameters using gentle motor skill type movements. These gentle motor skill type movements may involve primarily the grasping hand that is operated primarily by the forearm muscles via the wrist joint. Operating handle 40 by gentle motor skill type movements may enable the user to gain good control over handle 40 and more particularly over fine adjustments when operating handle 40. Under these conditions, the user may stabilize himself against handle 40 and even lean on it while operating it since the intersection point of the three axes of rotation 45, 46 and 47 is fixed in space and defines a pivot point of handle 40 that is fixed in space as well. Operating handle 40 by gentle motor skill type movements may enable normal people to get better control over operated device 41, and may give challenged people the ability to operate devices they had difficulties operating using prior art control handles or even operate devices they could not operate at all. Having intersection point 44 at a fixed point in space at approximately the center of the graspable area of handle 40 may help avoiding unwanted inputs to handle 40 which could happen as a result of shaking hand or body of the user a shaky environment.

When L1 is around 2-6 cm, the user may hold ends 48 and 49 of handle 40 between two fingers and operate handle 40 with his fingers in a way that one or more fingers are pushing or pulling one end of handle 40 while the other end is simultaneously being pulled or pushed with another finger or fingers to the opposite direction. Again, the user may operate handle 40 using gentle motor skill type movements using primarily the fingers that are operated primarily by the hand and forearm muscles via the fingers joints. This will enable the user to gain good control over a very small handle and easily perform fine adjustments when operating the handle. Using the fingers enables extreme gentle motor skill type movements that enable better control over very small movements than when using the arm or the whole hand.

When operating handle 40 smaller movements, and hence a smaller handle are required to perform the same task at the same efficiency, when compared to prior art bandies e.g., handle 501 depicted in FIG. 1A. Smaller handles require smaller parts, less material, weigh less, etc. Shorter handles may deliver smaller lever forces and thus may require less robust construction and may sustain even if produced from weaker materials. Smaller handles may save space, cost less to produce and result in an overall less expansive and environmental friendly product.

When L1 is longer than about 20 cm, the user may operate handle 40 using both hands in a way that one hand is pushing one end of the handle while the other end is simultaneously pulled with the other hand. In this configuration, the intersection point passes close to the area defined by the midpoint between the two holding areas. Hence, the user may apply a large force when operating handle 40. This will enable the user to gain good control over big and hard to operate mechanisms and easily perform fine adjustments when operating such handle. Such handles may enable control of devices that requires high forces to be operated by multi axis handle 40.

Handle 40 may specially suit limited users such as handicapped, old, ill, exhausted people, etc. When designed as a graspable handle, handle 40 may allow the user to fully grasp handle 40 while operating it. Since intersection point 44 of axes of rotation 45, 46 and 47 lie in a fixed point in space at approximately the handle's center, the user is allowed to lean and stabilize his body against handle 40 while operating it.

In case handle 40 extends enough to both sides of axes of rotation 46 and 47, handle 40 may be manipulated about axes of rotation 46 and 47 by only applying push forces, for example, pushing end 48 of handle 40 to rotate handle 40 about axes 46 or 47, and pushing the other end 49 of handle 40 to rotate handle 40 about axis 46 or 47 to the other direction. Similarly, handle 40 may be manipulated about axes of rotation 46 and 47 by only applying pull forces. For example, a user may manipulate handle 40 about axes of rotation 46 and 47 using, for example, the elbow for applying push forces, or by applying pull forces, using, for example, a hook. Additionally, the user may hold one side of the handle with one hand and at the same time hold the other end with the other hand find operate the handle using both hands simultaneously to apply force in opposite directions etc.

Handle 40 is specially suited for use at infected places such as public toilets, hospitals and surgery rooms or other places that require the user to keep his kinds from touching a possible contaminated operating handle or at places where the user might want to keep his dirty hands from contaminating the handle such as devices that are used by mechanical workers with dirty hands, etc., as it enables full operation of the device without the need to touch the handle with the hand and alternatively use the elbow or other body part. At suitable size and form, handle 40 may be operated using the elbow, forehead, knee or any other body organ as well as with the assistance of a walking stick, cloth part, prostheses or any other object.

Handle 40 may include sub elements such as a concave section at the top tip of handle 40 for the user's thumb tip, a texture on the surface of handle 40 to avoid slipping, graphic and 3D elements that illustrates and leads the user to use the handle correctly, etc.

The movement ability of handle 40 may be physically restricted to fit operational or user needs.

Handle 40 may deliver indication feedbacks regarding its relative position, its influence on actuated device 41 and even dynamic feedbacks such as counter force or movements created and transformed from actuated device 41 to handle 40. These feedback indications can be tactile, auditory, visual or in relation to any other sense or senses combination.

Handle 40 may include a brake element (not shown) that may 'lock' handle 40, e.g., prevent handle 40 from rotating about one or more of axes of rotation 45, 46 and 47. This brake may be operated manually or automatically. Control mechanism 43 may include an interruption element (not shown) that may an off and reconnect influence of handle 40 on one or more aspects of actuated device 41, either manually or automatically. Handle 40 may include a friction element (not shown) that may apply constant or changing friction force to handle 40. Control mechanism 43 may include buttons, switches or other input devices on it, either mechanical, electronic or of other type, to act for example, as a horn operator, liquid sprinkler, light switch, mechanical brake etc.

Handle 40 may include an additional dedicated element (not shown), such as a spring or electronic motor or magnetic element or any other element, that may bring handle 40 back to a base position alter handle 40 is moved. Handle 40 may include an element that directs handle 40 to several base positions. This element may automatically move handle 40 from one base position to another.

Handle 40 may be made of any suitable material such as various types of metal, plastics and any other suitable material. Handle 40 may include a plurality of elements that assembled or attached to each other that work together to achieve the embodiments of the present invention, as long as the assembly and the organization of the pails together, enables the practical use of the handle as described in this document.

Movement transformation assembly 42 may transform movements of handle 46 into control commands to operated device 41 using mechanical mechanisms. Alternatively, movement transformation assembly 42 may transform movements of handle 46 into electrical signals that may be fed using an analog to digital (A/D) converter (not shown) into a processing unit (not shown) and transformed into control commands by the processing unit. Movement transformation assembly 42 may be disposed m a confined space, e.g., in a tunnel 50. Disposing movement transformation assembly 42 in a narrow tunnel may prevent using bulky and cumbersome mechanisms for transferring the control signals from handle 40 to operated device 41. Additionally, it may enable concentrating the interface of operated device 41 in one area and thus may result in a simpler interface design, production and maintenance.

Movement transformation assembly 42 may extend from any side of handle 40 or may be attached to the handle at different areas of handle 40. Movement transformation assembly 42 may pass through a straight or curved tunnel 50 to fit operated device 41 and the operator needs. Movement transformation assembly 42 may be attached to handle 40 at different areas of handle 40. Movement transformation assembly 42 may have mote than one attaching point to handle 40 and to operated device 41 and may combine different operators, separated from each other. For example, Movement transformation assembly 42 may have a parallelogram design that is attached to handle 40 at two different areas etc.

Movement transformation assembly 42 may perform movement transformations to enable control and operation of different elements of the operated device. For example, movement transformation assembly 42 may transform rotational movements of handle 40 into any desirable movements of an element of operated device 41. For example, movement transformation assembly 42 may transform rotational movements of handle 40 into rotational movements, linear movements, pivotal movements, combinations of these movements or any other movement of elements of an operated assembly in operated device 41. Movement transformation assembly 42 may transform rotational movements of handle 40 into linear movements of an element of operated device 41, for example, sliding element a rocking lever, a cog-wheel a push button, etc. Movement transformation assembly 42 may perform different types of operations such as push and pull elements, open and close valves, doors or gates, enlarge and reduce distance between elements, manipulate electro mechanical or magnetic elements, etc.

When only a short handle's movement is needed, movement transformation assembly 42 may be short and may be located close to the surface of the actuated device and this save space, weight, material, production costs, etc.

Movement transformation assembly 42, as well as handle 40, may be mechanical. In some electric devices operated with multiple axes handles, such as in airplanes or other sensitive operating systems, there is a need to isolate electromagnetic induction from the environment. In cases like that, handle 40 may be used to transform and deliver control inputs front outside of the electromagnetic sensitive device into the electromagnetic protected area since no electric or electronic elements needs to exist in handle 40 itself or at movement transformation assembly 42.

The length of movement transformation assembly 42, marked L2, may vary as may be required to meet specific design requirements. Length L2 movement transformation assembly 42 may set the distance between handle 40 and operated device 41. In some applications, that length may be significant. For example, length L2 of movement transformation assembly 42 may be selected to be as short as possible to save space, material and production costs yet long enough to enable the proper operation of handle 40 and to meet other design requirements. For example, in some applications, movement transformation assembly 42 may be long enough to enable a user to fully grasp handle 40 with his hand and move handle 40 all the way to all possible directions about each and every axes of rotation 45, 46 and 47, by providing enough space for the hand and fingers. In case handle 40 is designed to be operated by the index and thumb fingers, movement transformation assembly 42 may be king enough to provide enough space between handle 40 and actuated device 41 for the fingers, so that the operation movements of the fingers and handle is no limited and the fingers may not be pinched or caught between moving elements etc.

In some applications of the present invention, for example, when operated device 41 is producing much heat or unhealthy materials that the user will fry to avoid touching, L2 may be increased to enable sufficient distance between handle 40 and operated device 41.

Movement transformation assembly 42 may be long and flexible. For example, movement transformation assembly 42 may include flexible parts, such as cables 403, 404 in depicted in FIGS. 7A, 7B. A long and flexible movement transformation assembly 42 may suit various applications of control mechanism 43. For example, long flexible movement transformation assembly, similar to movement transformation element 42, may suit medical applications, such as when control mechanism 43 is implemented in a surgical instrument. The surgeon may move handle 40 at one end of long and flexible movement transformation assembly 42 and operated device 41 may be located inside the patient's body at the otter end. The movement transformation assembly 42 may be based on a flexible pipe including cables that run inside the pipe, transferring movement inputs from handle 40 to operated device 41. In that way, handle 40 may be mounted in different places to enable comfortable working position for different users at different situations and operated device 41 may be placed in different places to reach different body parts of the patient.

Movement transformation assembly 42 may be made of firm parts that enable pull and push force transformation or of flexible parts, such as cables or chains that enable only pull force transformation. Movement transformation assembly 42 may also include magnetic or any other force or movement transformation material or technology. Movement transformation assembly 42 may include more than one material, mechanical principle or technology.

When the mounting point of the handle's movement transformation assembly to the actuated device or to any other element can be moved in space, grabbing the handle may allow the user to move the handle and the attached element by using primarily the arm and forearm that are operated primarily by using the arm and shoulder muscles via the elbow and shoulder joints, at gross motor skill type movements, to a certain direction, forward, backward, upward, downward and sideward in linear movements or in free three dimensional movement in space, regarding the attached element ability to be moved, and all of that can be done parallel to the operation of the handle in reference to its inherent two or more axes of rotation simultaneously and independently of each other.

Figure 5D:
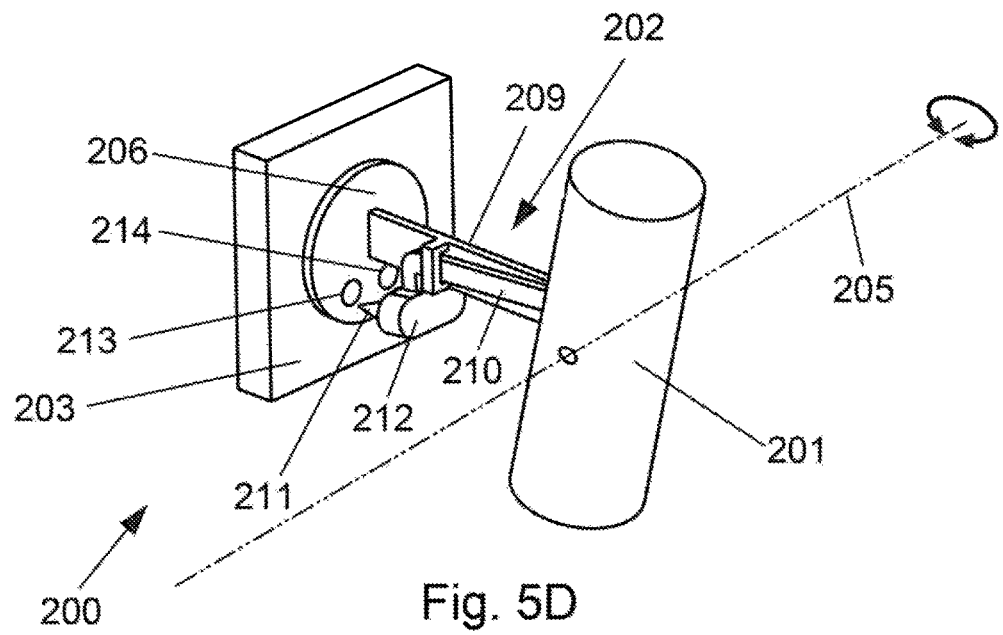
FIG. 5D is a schematic 3D illustration of the double axis control mechanism depicted in FIG. 5A, with the handle rotated about a second axis of rotation to a fully open position.
Figure 5E:
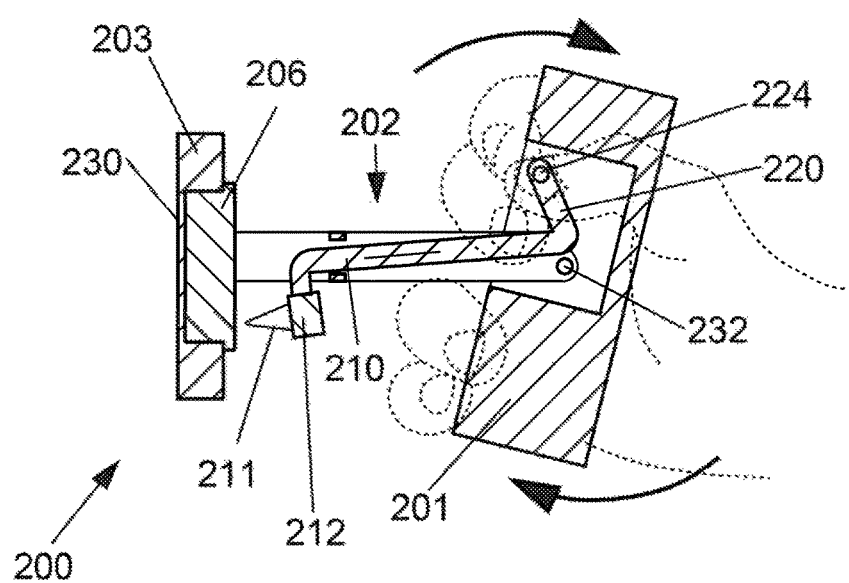
FIG. 5E is a schematic cross section illustration of the double axis control mechanism depicted in FIG. 5A along section plane I-I, with the handle rotated about the second axis of rotation to a fully open position.
Figure 5F:
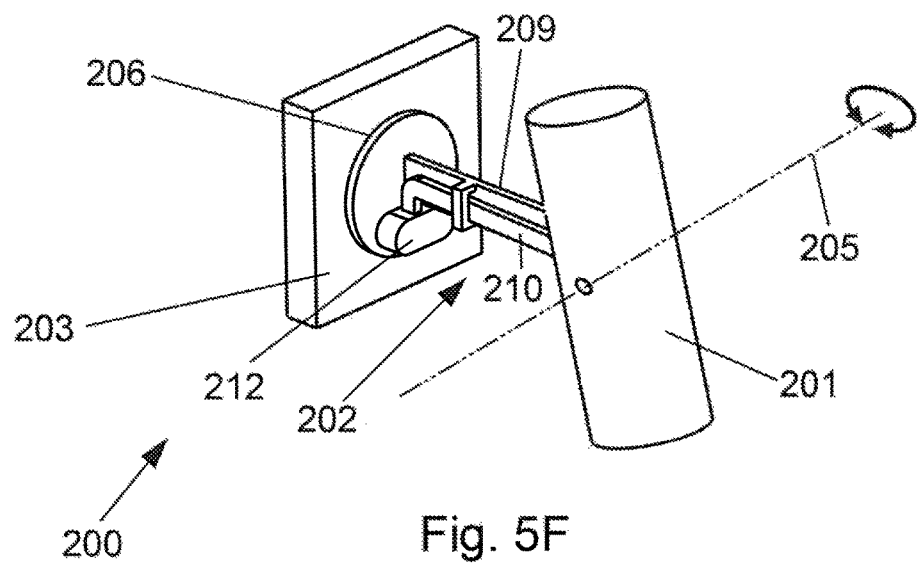
FIG. 5F is a schematic 3D illustration of the double axis control mechanism depicted in FIG. 5A, with the handle rotated about the second axis of rotation to a fully closed position.
Figure 5G:
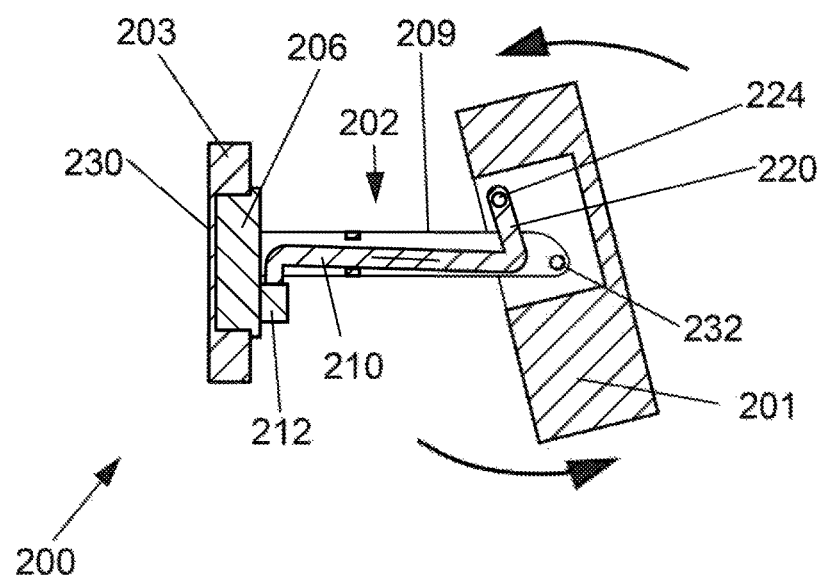
FIG. 5G is a schematic cross section illustration of the double axis control mechanism depicted in FIG. 5A along section plane I-I, with the handle rotated about the second axis of rotation to a fully closed position.
Figure 5H:
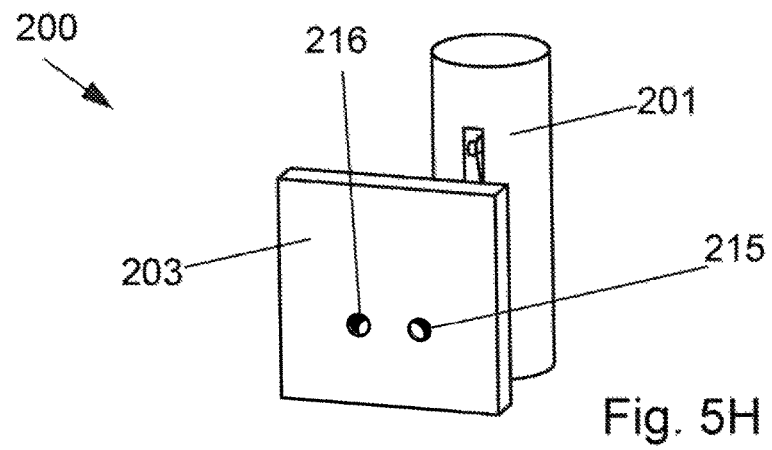
FIG. 5H is a schematic 3D illustration of the double axis control mechanism depicted in FIG. 5A, with the handle in middle position.
Figure 5I:
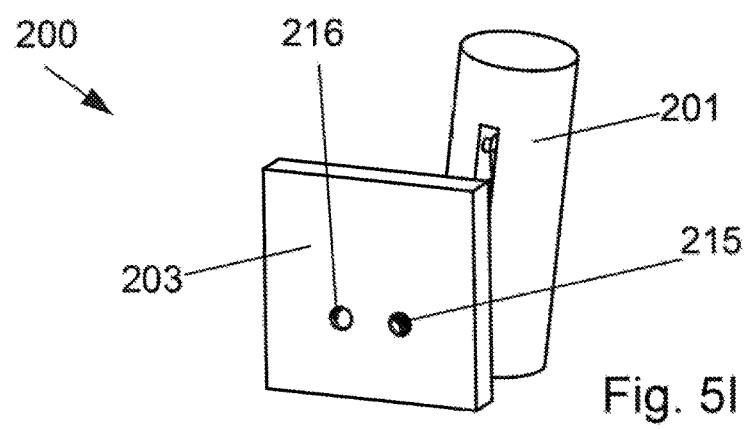
FIG. 5I is a schematic 3D illustration of the double axis control mechanism depicted in FIG. 5A, with the handle slightly rotated about a first axis of rotation.
Figure 5J:
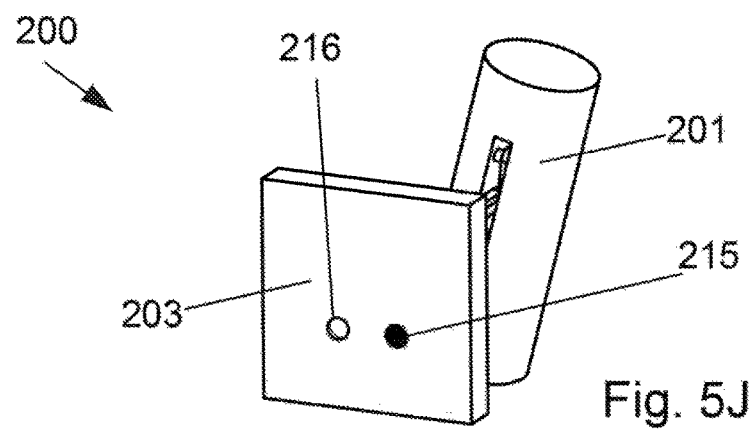
FIG. 5J is a schematic 3D illustration of the double axis control mechanism depicted in FIG. 5A, with the handle rotated about the first axis of rotation.

Reference is now made to FIGS. 5A, 5D, 5F, 5H, 5I and 5J, which are schematic 3D illustrations of a double axis control mechanism 200 according to some embodiments of the present invention; reference is further made to FIG. 5B, which is a schematic front view of double axis control mechanism 200, and to FIGS. 5C, 5E and 5G, which are schematic cross section illustrations of double axis control mechanism 200 along section plane I-I marked on FIG. 5B. In FIGS. 5A, 5B, 5C and 5H, handle 201 in a middle (e.g., partially opened) position. In FIGS. 5D and 5E, handle 201 is rotated about axis of rotation 505 to a fully open position. In FIGS. 5F and 5G, handle 201 is rotated about axis of rotation 505 to a fully closed position. In FIGS. 5I and 5J, handle 201 is rotated about axis of rotation 504.

According to some embodiments of the present invention, double axis control mechanism 200 may include double axis handle 201, operatively connected to movement transformation assembly 202 that transfers commands from double axis handle 201 to operated device 203. FIG. 5A depicts handle 201 at a middle position.

For example, operated device 203 may be a valve that mixes two types of gases, e.g., air and oxygen, and controls the amount of gas that runs through the valve, to provide a mixture of the two gases at controlled ratio. It should be readily understood that double axis control mechanism 200 may be used for a variety of other applications in which the relative flow and the overall from rate of two fluids need to be controlled, such as setting the relative amount of liquids such as water and juice and at the same time, control the flow rate of the mixed liquid to the glass, the relative amount of cornflakes and milk and at the same time the amount of sugar added to it, etc. Handle 201 may rotate about axes of rotation 204 and 205. Both axes of rotation 204 and 205 pass through handle 201, and meet in an intersection point or area 221 located within handle 201, for example at a center point of handle 201. According to some embodiments of the present invention, axes of rotation 204 and 205 may pass approximately through the center of handle 201 or through the center of the graspable area of handle 201. The graspable area of handle 201 is depicted in FIG. 5E as the area of handle 201 being grasped by the hand. Rotation of handle 201 about axis of rotation 204 may adjust a first control parameter, for example, the relative amount of each gas, while rotation of handle 201 about axis of rotation 205 may adjust a second control parameter, for example, the overall mixed gas flow rate. Rotation of handle 201 about axis of rotation 204 may rotate a disc 206 that has two holes 213, 214 over a surface 230 that has two corresponding holes 215, 216. Sliding disc 206 over surface 230 may adjust the size of the shared opening between holes 213, 214 and the surface holes 215, 216. Rotation of handle 201 about axis of rotation 205 may set the overall mixed gas flow rate from zero to maximum by linearly moving the double cone plug base 212 towards or away from holes 213, 214.

In FIGS. 5D and 5E, double axis control mechanism 200 is shown when handle 201 is rotated to a first possible direction about to axis of rotation 205, and in FIGS. 5F and 5G, double axis control mechanism 200 is shown when handle 201 is rotated to a second direction, opposite to the first direction illustrated in FIGS. 5D and 5E about axis of rotation 205.

Movement transformation assembly 202 may be connected to handle 201 in approximately the middle of the grasping area of handle 201, such that, when being grasped by a hand of a user, movement transformation assembly 202 may be located between the user's fingers, for example the middle finger and the ring finger as illustrated in FIG. 5E. Movement transformation assembly 202 may extend from one side of handle 201, thus enabling grasping handle 201 with the opposite hand without touching movement transformation assembly 202. Movement transformation assembly 202 may coincide with axis of rotation 204.

Movement transformation assembly 202 may include an elongated rod 210 for transferring rotation movements of handle 201 about axis of rotation 205 into control commands to operated device 203. Rod 210 may include bent extensions 220 and 222 at both ends. First extension 220 may be anchored to handle 201 at pivot point 224 located at a distance from axis of rotation 205 such that when handle 201 rotates about axis of rotation 205 elongated rod 210 moves back and forth relatively to axis of rotation 205 and to operated device 203, substantially along operating axis 204. A double plug base element 212 may be connected to second extension 222, including two conic plugs 211 that may move back and forth together with rod 210, to open and close corresponding holes 213, 214. Holes 213, 214 together with corresponding conic plugs 211 may be seen as forming a valve that controls the flow rate of the gas, awl that opens and closes as handle 201 rotates about axis of rotation 205.

When handle 201 is rotated about axis of rotation 205 to a first direction, as illustrated at FIG. 5D, rod 210 may be pulled away from operated device 203 along axis of rotation 204, pulling conic plugs 211 out of holes 213, 214. Thus, when handle 201 is rotated to the first direction, holes 213, 214 may open wider. When handle 201 is at a middle or base position about axis of rotation 205, as illustrated in FIGS. 5A and 5C, rod 210 may be pushed closer to operated device 203 compared with the previous position, pushing conic plugs 211 to partially cover holes 213, 214. Thus, when handle 201 is at middle position, holes 213, 214 may be partially open. When handle 201 is rotated all the way to the other possible direction about axis of rotation 205, as illustrated at FIGS. 5F and 5G, rod 210 may be pushed closer to operated device 203 compared with the base position, pushing conic plugs 211 to fully close holes 213, 214. Thus, when handle 201 is rotated to the other possible direction, holes 213, 214 may be fully closed.

Movement transformation assembly 202 may include a second rod 209 for transferring rotation movements of handle 201 about axis of rotation 204 to control commands to operated device 203. Rod 209 may be firmly attached to disc 206 and anchored to handle 201, for example at pivot point 232, such that, when handle 201 rotates about axis of rotation 204, disc 206 rotates about axis of rotation 204 together with handle 201. Since surface 230 may not rotate with the notation of handle 201 and disk 206 about axis of rotation 204, the size of the shared opening between holes couples 213 with 215, and 214 with 216, may change as well. FIG. 5H illustrates handle 201 at a middle or base position relatively to axis of rotation 204. When handle 201 is at middle position, the relative opening of the two holes couples 213 with 215 and 214 with 216 is equal to each pair, so the flow rate of the first gas running through the valve is equal to the flow rate of the second gas. When the handle 201 is slightly rotated about axis of rotation 204, as illustrated at FIG. 5I, the relative opening of holes couple 214 with 216 becomes bigger than the relative opening of boles couple 213 with 215. Hence, the flow rate of the first gas that runs through the valve may be bigger than the flow rate of the second gas. When handle 201 is further rotated about axis of rotation 204 to the same direction as in FIG. 5I, as illustrated at FIG. 5J, only the second gas can run through the valve while the hole of the first gas is completely closed.

Reference is now made to FIGS. 6A, 6B, 6C, 6D, 6E, 6F, 6G and 6H, which are schematic 3D illustrations of a triple axis control mechanism 300 according to embodiments of the present invention. According to some embodiments of the present invention, triple axis control mechanism 300 may include triple axis handle 305, operatively connected to movement transformation assembly 306 that transfers commands from triple axis handle 305 to operated device 307. Handle 305 may be similar to handle 201, depicted in FIG. 5A, with an addition of, or being formed as, a hollow cylinder 308 that wraps handle 305 and is rotatable about axis of rotation 301. Hollow cylinder 308 may have an opening 310 that may enable the movement transformation assembly 306 to extend from within handle 305 and to enable rotational spin of hollow cylinder 308 about a third axis of rotation 301. Movement transformation assembly 306 may have an additional operator 302 that transform movements of handle 305 about third axis of rotation 301 to a linear movement of a conic plug 304 that sets a relative opening of a third hole 303 (third to holes 213 and 214). Third hole 303 may enable flow of a third gas. For example, third hole 303 may enable moisturized air to flow through, in order to add moisture to the mixed air and oxygen. Turning handle 305 to one rotational direction about third axis of rotation 301, as illustrated at FIGS. 6A. 6B, 6C and 6D, may increase the flow rate of the third gas through hole 303, and turning handle 305 to the opposite direction, as illustrated at FIGS. 6E, 6F, 6G and 6H, may reduce the flow rate of the third gas through hole 303.

Figure 7A:
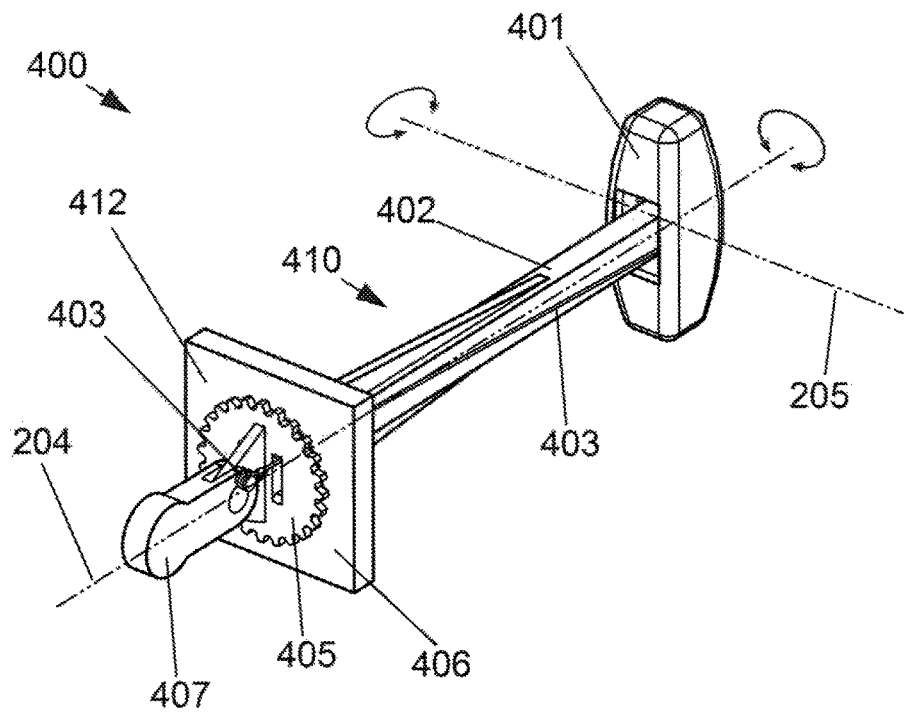
FIG. 7A is a schematic 3D illustration of a double axis control mechanism according to embodiments of the present invention in middle position.
Figure 7B:
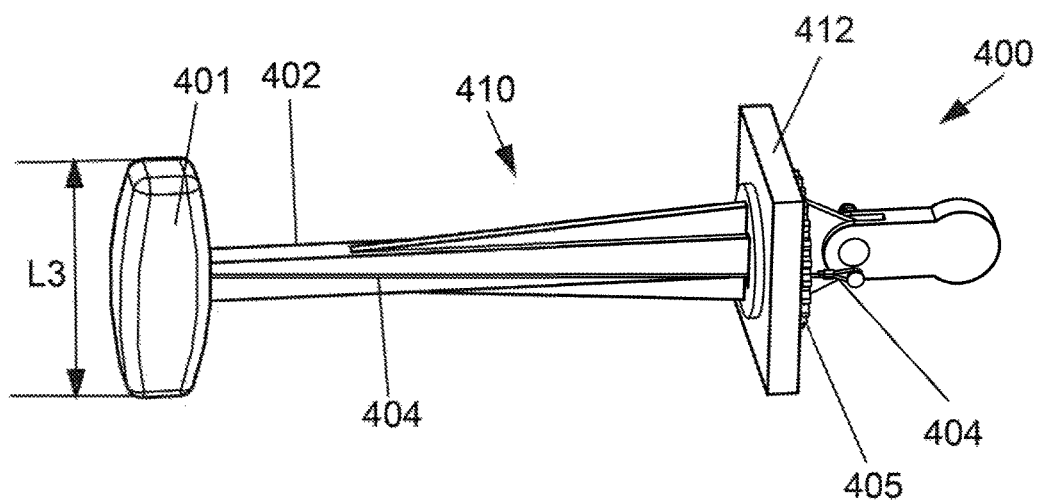
FIG. 7B is a schematic 3D illustration of the double axis control mechanism depicted in FIG. 7A from a different angle.
Figure 7C:
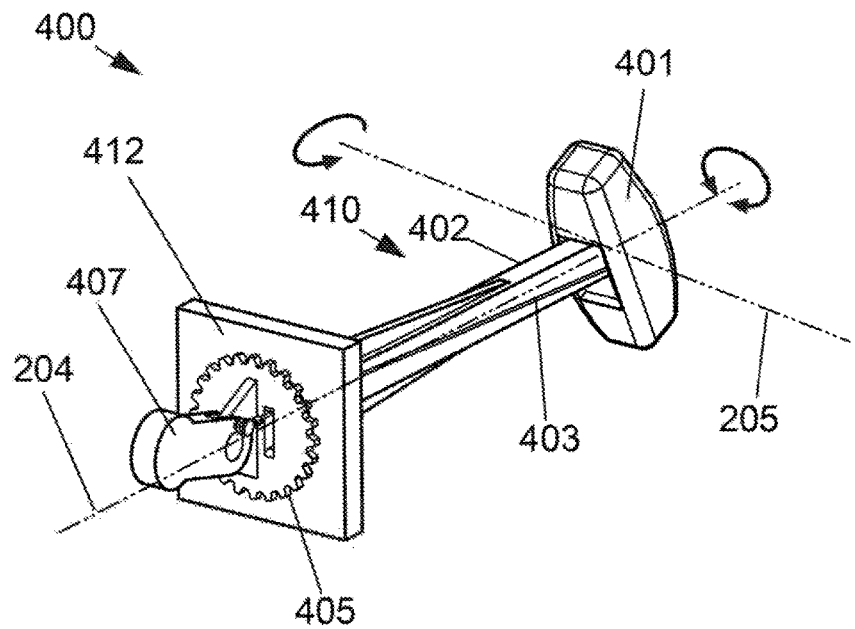
FIG. 7C is a schematic 3D illustration of the double axis control mechanism depicted in FIG. 7A, with the handle rotated about a second axis of rotation.
Figure 7D:
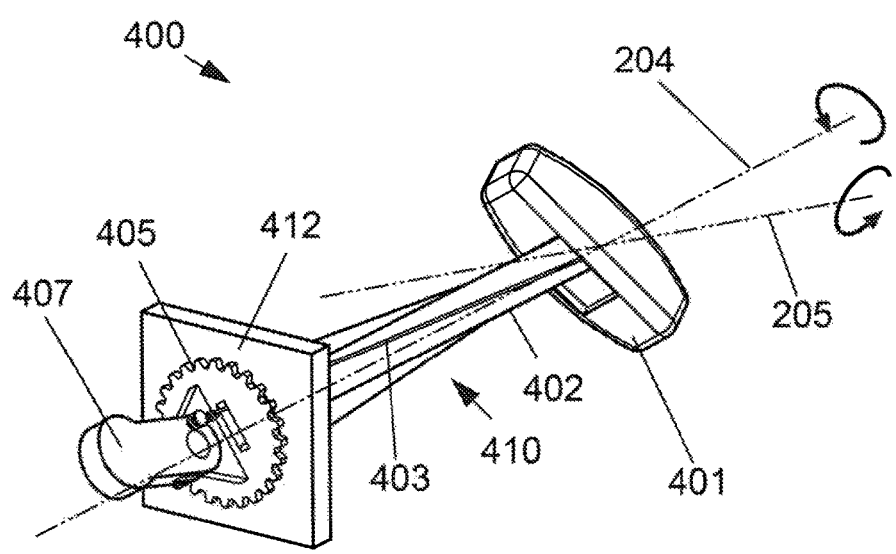
FIG. 7D is a schematic 3D illustration of the double axis control mechanism depicted in FIG. 7A, with the handle rotated about a first and second axes of rotation.

Reference is now made to FIGS. 7A, 7B, 7C and 7D, which are schematic 3D illustrations of another double axis control mechanism 400 according to some embodiments of the present invention, to FIG. 7E, which is a schematic front view of double axis control mechanism 200, to FIGS. 7F and 7G, which are schematic cross section illustrations of double axis control mechanism 400 along section plane II-II marked on FIG. 7E, and to FIG. 7H, which is a schematic cross section illustration of double axis control mechanism 400 along section plane V-V marked on FIG. 7E. In FIGS. 7A, 7B and 7F, handle 401 is at middle, or base position. In FIGS. 7C and 7G, handle 401 is rotated about axis of rotation 205 to a first direction. In FIG. 7H, handle 401 is rotated about axis of rotation 205 to a second and opposite direction. In FIG. 7D, handle 401 is rotated about both axes of rotation 204, 205.

According to some embodiments of the present invention, double axis control mechanism 400 may include double axis handle 401, operatively connected to movement transformation assembly 410 that transfers commands from double axis handle 401 to operated device 412.

Handle 401 may have a length, marked L3, of 2-6 cm, making handle 401 suitable to be operated with the fingers, as shown at FIG. 7G. Movement transformation assembly 410 may include two elements. The first being a firm element 402 that may transform rotation movements of handle 401 about axis of rotation 204 to a cog wheel 405 of operated device 412. The element that transforms rotation movements of handle 401 about axis of rotation 205 may include two cables 403 and 404 that run on both sides of firm element 402. Cables 403 and 404 may be connected on one end to handle 401 and to an element 407 of operated device 412 that can be tilted, on the other end. Cables 403, 404 may be installed opposite to one another so that, when handle 401 is rotated to one possible direction about axis of rotation 205, as illustrated at FIG. 7G, cable 403 pulls and tilts element 407, and when handle 401 is rotated to the opposite direction about axis of rotation 205, as illustrated at FIG. 7H, cable 404 pulls and tilts element 407 to the opposite direction. When the handle 401 is rotated about axes of rotation 204, 205 at the same time, both cog wheel 405 and element 407 are influenced, as illustrated in FIG. 7D.

A handle according to some embodiments of the present invention may be used to operate a single lever mixer faucet. Such faucets are operated using a double axis single handle to gain control over two control parameters: water flow rate, from zero to maximum and vice versa and water temperature, from cold to hot and vice versa. Using the faucet with a handle and a movement transformation assembly according to some embodiments of the present invention may improve the user experience and reduce the waste of water that happens when using the faucet with the prior art handles, for example, handle 501 shown in FIG. 1A.

Figure 8A:
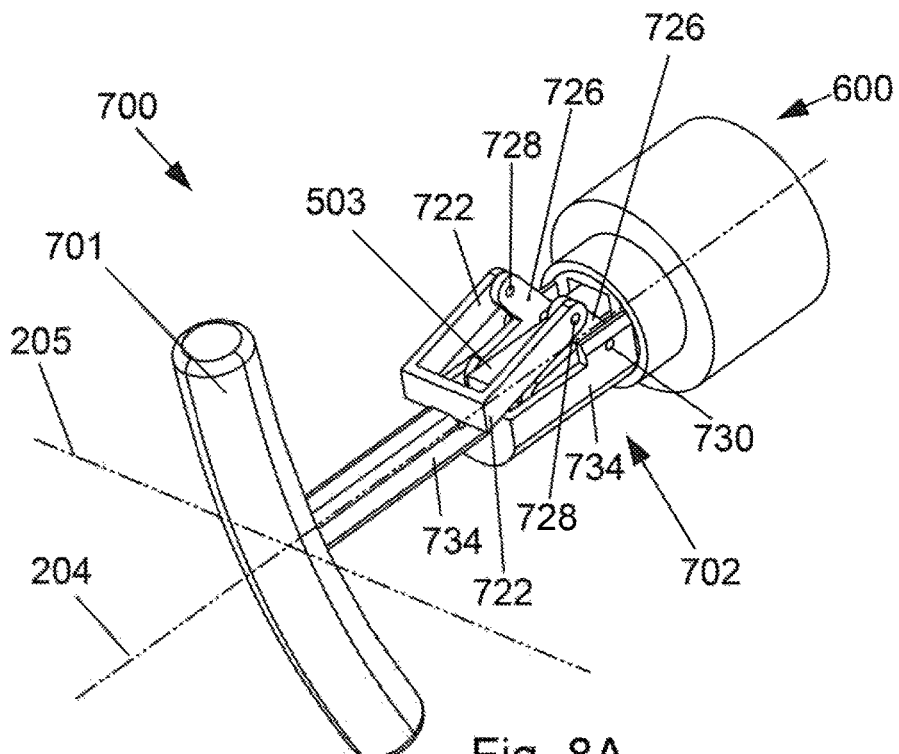
FIG. 8A is a schematic 3D illustration of a double axis control mechanism according to embodiments of the present invention, with the handle at base position.
Figure 8B:
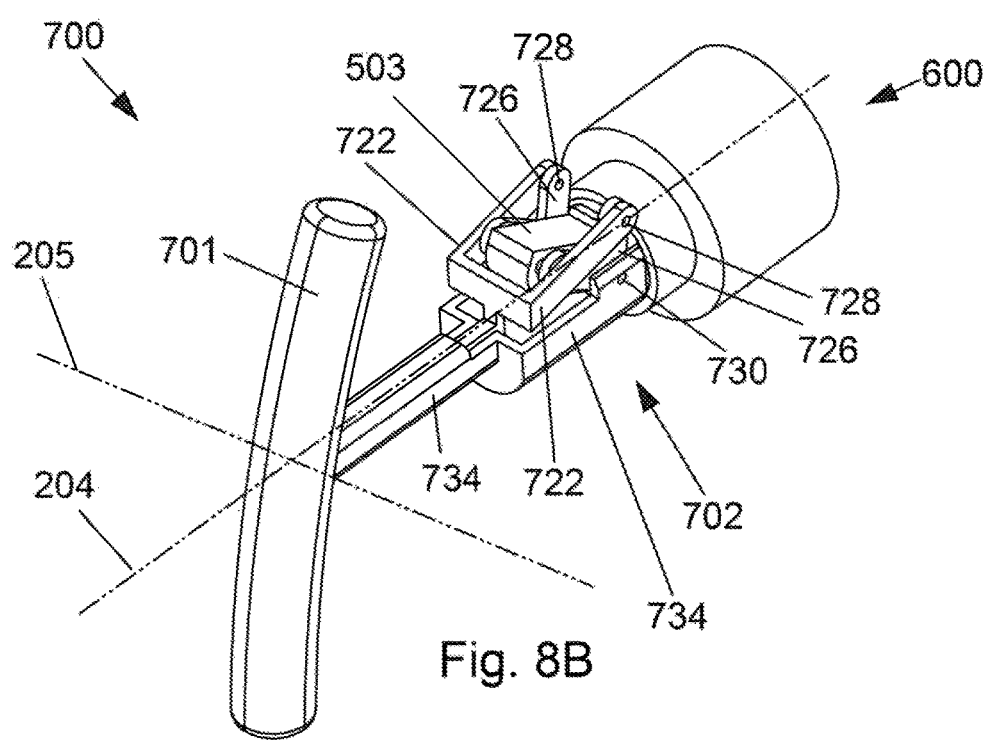
FIG. 8B is a schematic 3D illustration of the double axis control mechanism depicted in FIG. 8A, with the handle rotated about a second axis of rotation.
Figures 8C, 8D:
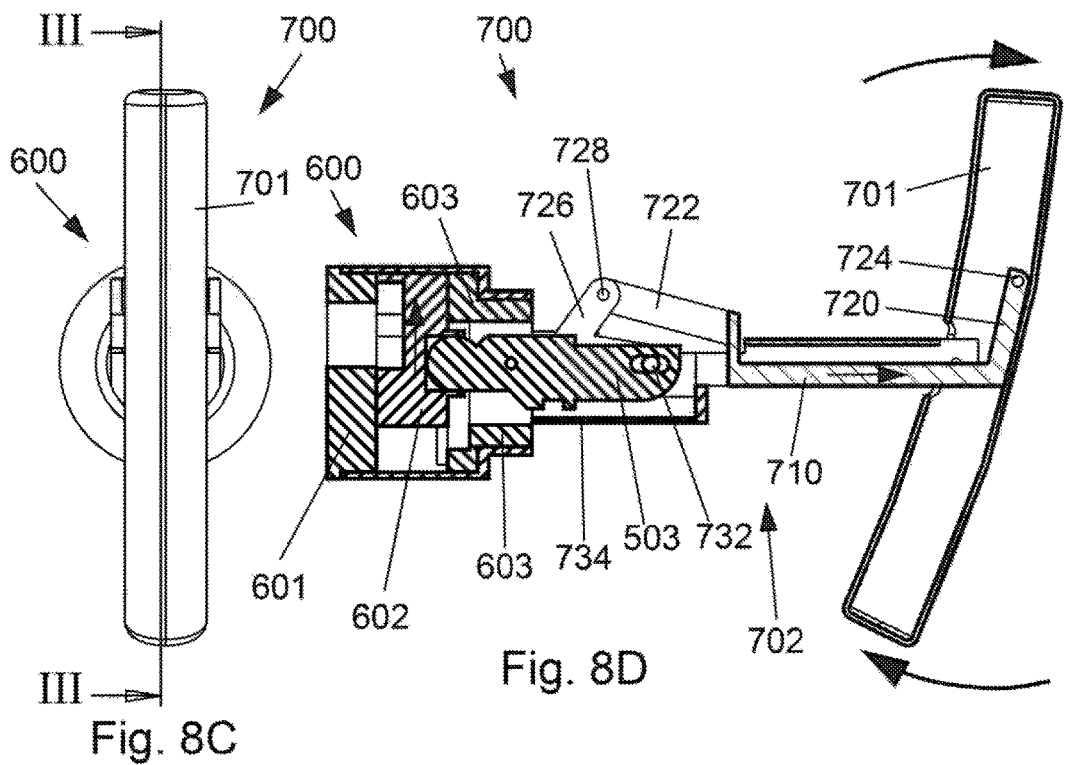
FIG. 8C is a schematic front view of the double axis control mechanism depicted in FIG. 8A, with the handle at base position.
FIG. 8D is a schematic cross section illustration of the double axis control mechanism depicted in FIG. 8A along section plane III-III, with the handle at base position.
Figure 8E:
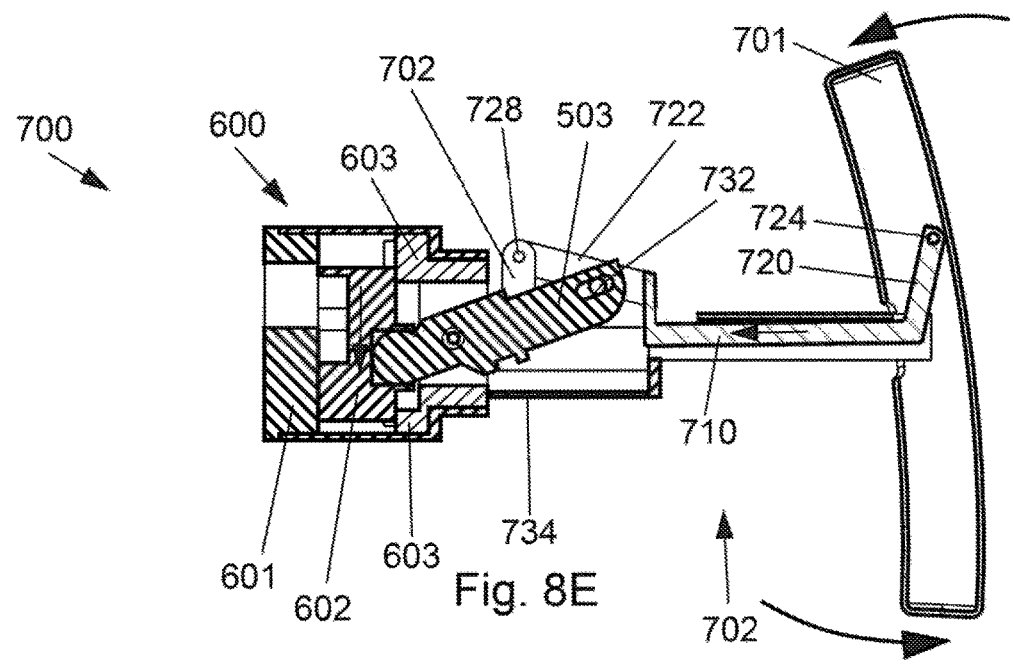
FIG. 8E is a schematic cross section illustration of the double axis control mechanism depicted in FIG. 8A along section plane III-III, with the handle rotated about the second axis of rotation.

Reference is now made to FIGS. 8A and 8B, which are schematic 3D illustrations of double axis control mechanism 700 according to embodiments of the present invention, to FIG. 8C, which is a schematic front view of double axis control mechanism 700, and to FIGS. 8D and 8E, which are schematic cross section illustrations of double axis control mechanism 700 along section plane III-III marked on FIG. 8C. In FIGS. 8A, 8C and 8D, handle 701 is at base position (e.g., the faucet is fully closed). In FIGS. 8B and 8E, handle 701 is rotated about axis of rotation 205.

According to some embodiments of the present invention, double axis control mechanism 700 may include double axis handle 701, operatively connected to movement transformation assembly 702 that transfers commands from double axis handle 701 to cartridge 600 of a faucet. Cartridge 600 is the operated device in the application of double axis control mechanism 700 to faucets.

For example, movement transformation assembly 702 may transform operating movements of handle 701 about axes of rotation 204, 205. When rotating handle 701 about axis of rotation 205, movement transformation assembly 702 may transform rotation of handle 701 to a tilt of cartridge's lever 503 that may slide movable plate 602, thus controlling the water flow rate. When operating handle 701 rotates about axis of rotation 204, movement transformation assembly 702 may transform the movement of handle 701 to a rotation of base block 603 that rotates movable plate 602 and sets the relative mixture of cold and hot water.

According to some embodiments of the present invention, movement transformation assembly 702 may include a member 734 for transferring rotation movements of handle 701 about axis of rotation 204 to control commands to cartridge 600, an elongated rod 710 for transferring rotation movements of handle 701 about axis of rotation 205 to control commands to cartridge 600. Rod 710 may include bent extensions 720 and 722 at both ends. First extension 720 may be anchored to handle 701 at pivot point 724 located at a distance from axis of rotation 205 such that when handle 701 rotates about axis of rotation 205 elongated rod 710 moves substantially back and forth relatively to axis of rotation 205 and towards or away from cartridge 600. Alternatively, Rod 710 may not include bent extension 720 and may be connected at an end of rod 710 to handle 701 at pivot point 724. Extension 722 may be anchored at pivot point 728 to an end of at least one rocker 726. Alternatively, rod 710 may not include bent extension 722 and may be connected at a second end of rod 710 to an end of at least one rocker 726.

Each of rockers 726 may be a bent lever that conveys linear movement from rod 710 into tilt movement of lever 503 of cartridge 600. The second end of rockers 726 may be anchored to lever 503 at pivot point 732, and at some point, e.g., as its knee, rocker 726 may be anchored at pivot point 730 to a member 734 that is fixed to base block 603 of cartridge 600. When rod 710 moves towards or away from cartridge 600, as a result of rotating of handle 701 about axis of rotation 205, rocker 726 tilts lever 503. When handle 701 rotates about axis of rotation 204, it may also rotate member 734, which is anchored to handle 701. Member 734 may in turn rotate base block 603 of cartridge 600 that spins movable plate 602 and may set the relative mixture of cold and hot water.

Figure 9A:
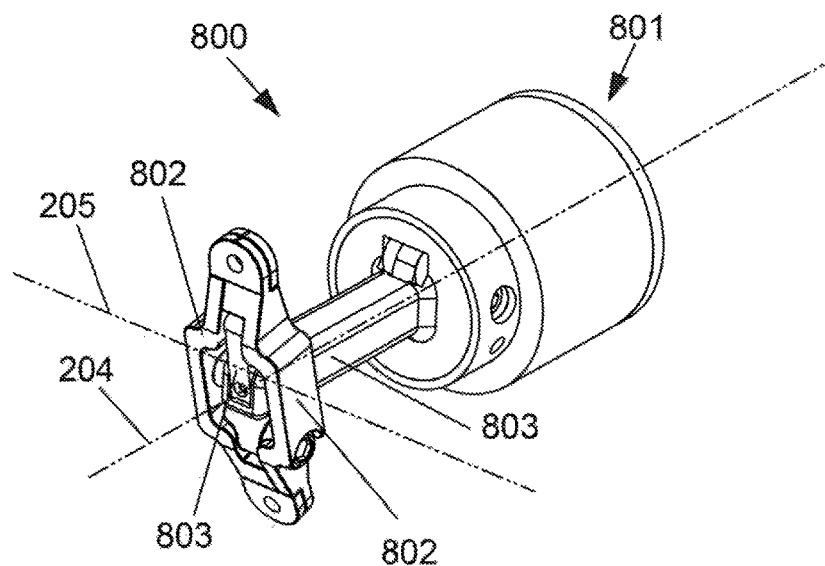
FIG. 9A is a schematic 3D illustration of a double axis control mechanism according to embodiments of the present invention, with the handle at base position.
Figures 9B, 9C:
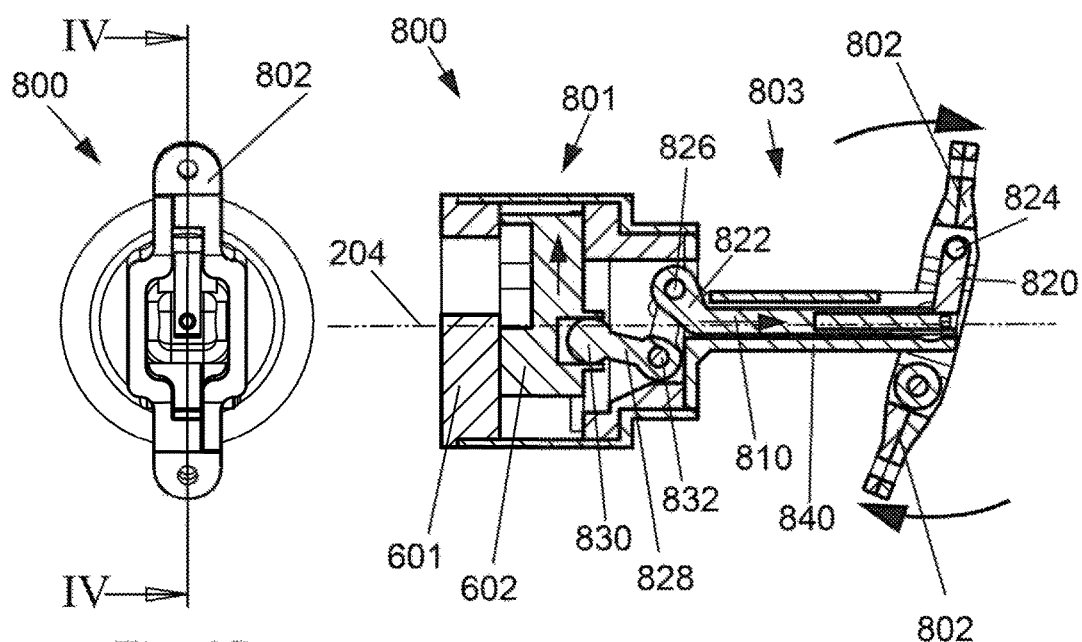
FIG. 9B is a schematic front view of the double axis control mechanism depicted in FIG. 9A, with the handle at base position.
FIG. 9C is a schematic cross section illustration of the double axis control mechanism depicted in FIG. 9A along section plane IV-IV, with the handle at base position.

Reference is now made to FIGS. 9A, 9D and 9E, which are schematic 3D illustrations of another double axis control mechanism 800 according to some embodiments of the present invention, to FIG. 9B, which is a schematic front view of double axis control mechanism 800, and to FIGS.

9C and 9F, which are schematic cross section illustrations of double axis control mechanism 800 along section plane IV-IV marked on FIG. 9B. In FIGS. 9A, 9B and 9C, handle 802 is at base position. In FIGS. 9D, 9E and 9F, handle 802 is rotated about axis of rotation 205.

According to some embodiments of the present invention, double axis control mechanism 800 may include double axis handle 802, operatively connected to movement transformation assembly 803 that transfers commands from double axis handle 802 to modified cartridge 801 which is the operated device in the application of double axis control mechanism 800 to faucets. Cartridge 801 may include a static plate and a movable plate such as static plate 601 and movable plate 602.

According to some embodiments of the present invention, movement transformation assembly 803 may extend into the cartridge 801 in replacement to lever 503 of cartridge 600. Eliminating lever 503 may enable shorter distance between handle 802 and cartridge 801 in comparison to the embodiment presented in FIG. 8A. When operating the handle 802 about axis of rotation 205, movement transformation assembly 803 may transform movement of handle 802 into sliding of movable plate 602 over static plate 601, thus controlling the water flow strength. When operating handle 802 rotates about axis of rotation 204, movement transformation assembly 803 may transform movement of handle 802 into a swing of base block 603 of cartridge 801 that spins movable plate 602 and may set the relative mixture of cold and hot water.

Movement transformation assembly 803 may include an elongated rod 810 for transferring rotation movements of handle 802 about axis of rotation 205 to control commands to cartridge 801. Rod 810 may include bent extensions 820 and 822 at both ends. First extension 820 may be anchored to handle 802 at pivot point 824 located at a distance from axis of rotation 205 such that when handle 802 rotates about axis of rotation 205 elongated rod 810 moves back and forth relatively to axis of rotation 205 and to cartridge 801. Alternatively, Rod 810 may not include bent extension 820, and may be connected at an end of rod 810 to handle 802 at pivot point 824.

A second bent extension 822 of rod 810 may be anchored at pivot point 826 to rocker 828. Rocker 828 may be a bent lever that conveys linear movement from rod 810 into linear movement of plate 602. Alternatively, rod 810 may not include bent extension 822 and may be connected at a second end of rod 810 to an end of rocker 828. The second end of rocker 828 may be anchored to plate 602 at pivot point 830, or otherwise attached to plate 602, and at some point, e.g., as its knee, rocker 828 may be anchored at pivot point 832 to a member that is fixed to base block 603 of cartridge 800. When rod 810 moves towards or away from cartridge 800 along an X axis marked on FIG. 9F, as a result of rotating of handle 802 about axis of rotation 205, rocker 828 moves plate 602 along Y axis marked on FIG. 9F, perpendicular to the X axis. Movement transformation assembly 803 may include an elongated member 840, anchored to handle 802 at one end and fixed to base block 603 at a second end. Member 840 may rotate about axis of rotation 204 when handle 802 rotates about axis of rotation 204, rotating base block 603 and thus plate 602, and thus deliver rotational movements of handle 802 about axis of rotation 204 to cartridge 801.

Figure 10A:
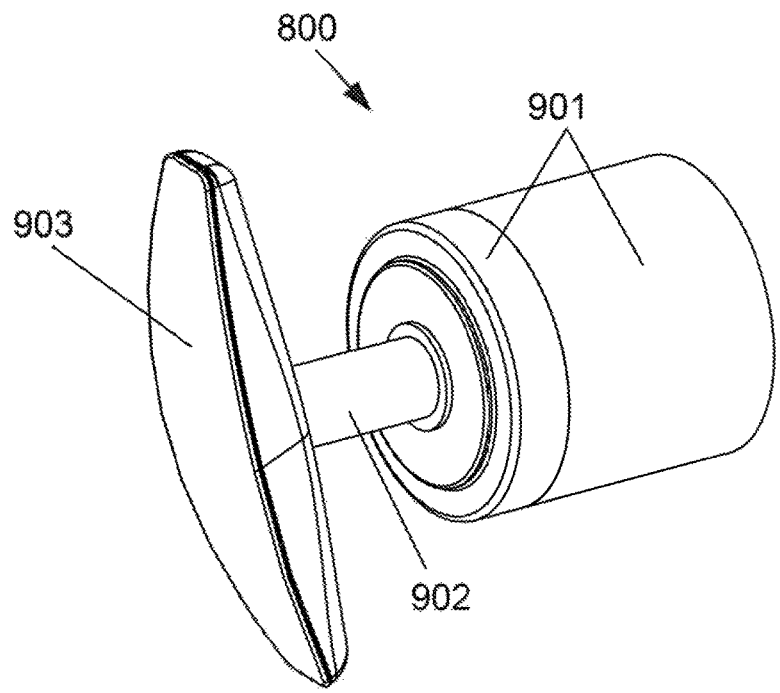
FIG. 10A is a schematic 3D illustration of the double axis control mechanism depicted in FIG. 9A with a cover according to some embodiments of the present invention.
Figure 10B:
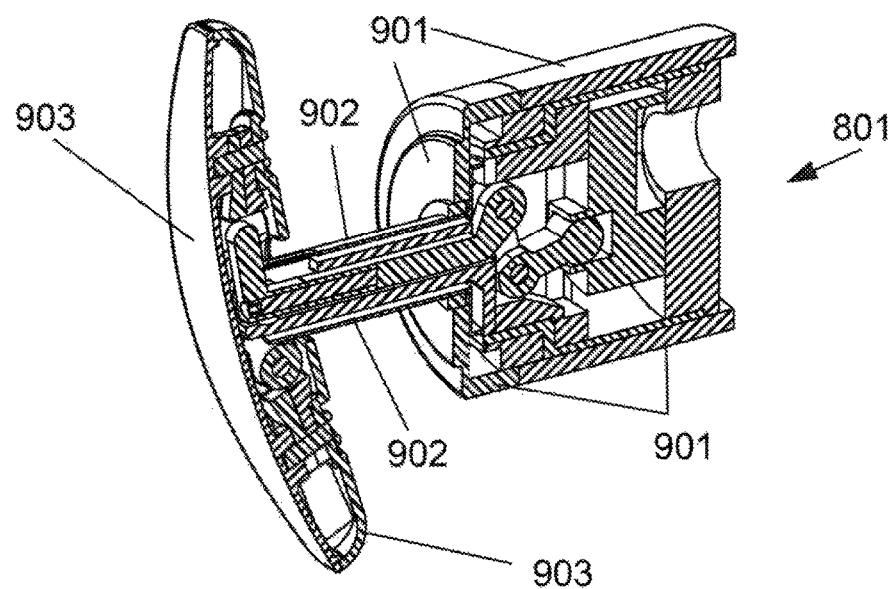
FIG. 10B is a schematic cross section illustration of the double axis control mechanism depicted in FIG. 9A with a cover along section plane IV-IV.

Reference is now made to FIG. 10A, which is a schematic 3D illustration of double axis control mechanism 800 with a cover according to some embodiments of the present invention, and to FIG. 10B, which is schematic cross section illustrations of double axis control mechanism 800 with a cover along section plane IV-IV marked on FIG. 9B.

According to some embodiments of the present invention, all assemblies of the handles and movement transformation assembly mentioned hereinabove may be covered for esthetic, safety, protection, convenience of use etc. For example, FIGS. 10A and 10B illustrate an example of a cover to handle 802, movement transformation assembly 803 and dedicated cartridge illustrated at FIG. 9A. Cover 901 covers cartridge 801, cover 902 covers movement transformation assembly 803 and cover 903 covers the handle 802.

It should be readily understood by these skilled in the present invention is not limited in to the specific example shown, and embodiments of the present invention may be used for various other applications, and the specific design of the handle and movement transformation assembly may vary to meet specific design requirements.

Figure 11A:
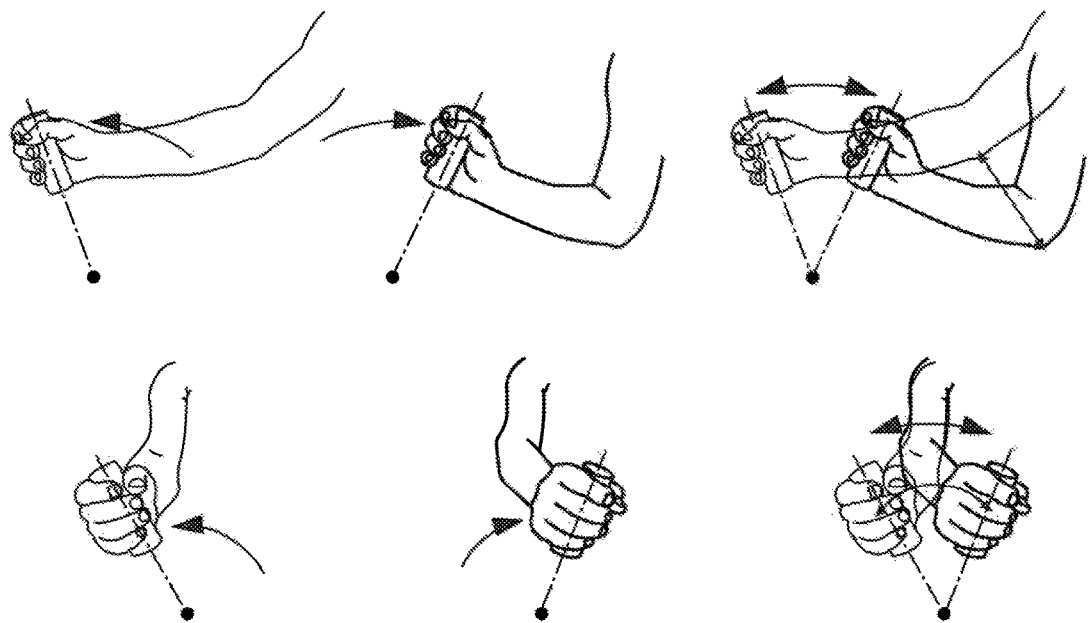
FIG. 11A demonstrates exemplary gross motor skill type movements needed for operating a prior art handle.
Figure 11B:
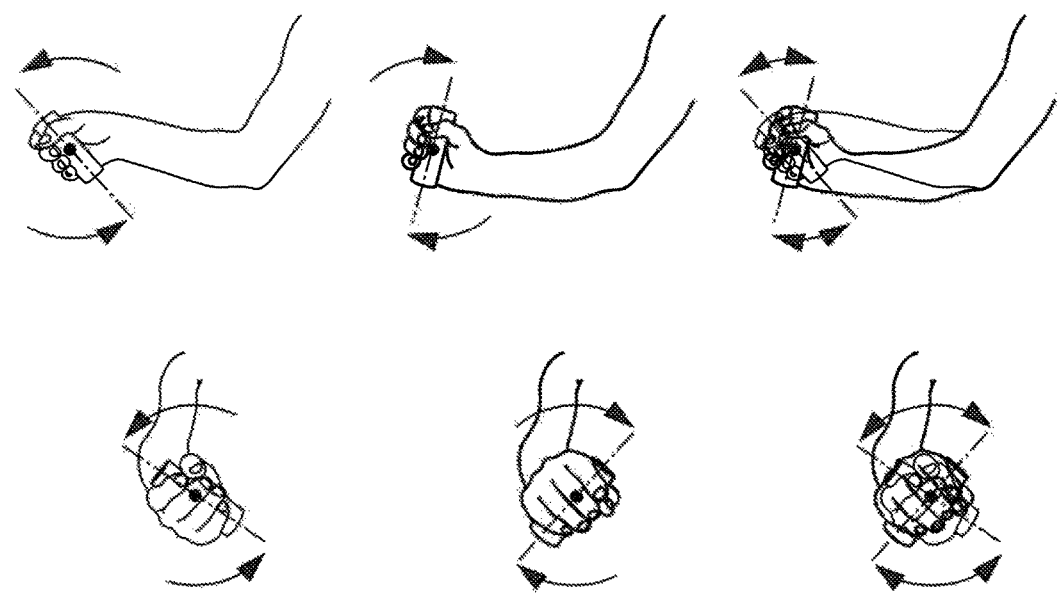
FIG. 11B demonstrates exemplary gentle motor skill type movements needed for operating a handle according to some embodiments of the present invention with the palm of the hand.
Figure 11C:
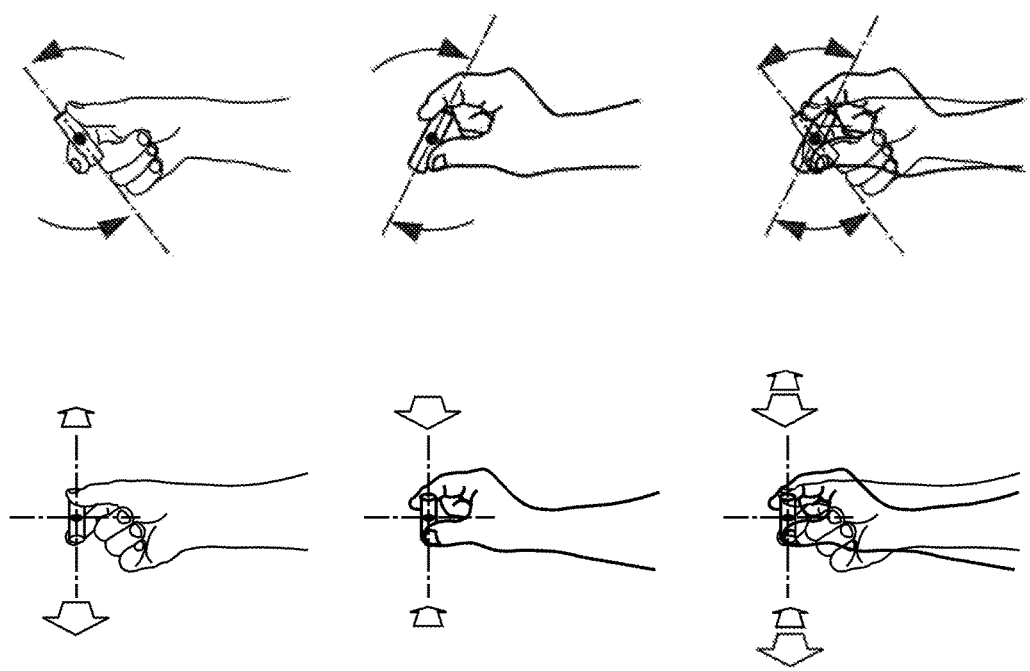
FIG. 11C demonstrates exemplary gentle motor skill type movements needed for operating a handle according to some embodiments of the present invention with the fingers.

Reference is now made to FIG. 11A demonstrating exemplary gross motor skill type movements needed for operating a prior art handle, to FIG. 11B demonstrating exemplary gentle motor skill type movements needed for operating a handle according to embodiments of the present invention with the palm of the hand, and to FIG. 11C demonstrating exemplary gentle motor skill type movements needed for operating a handle according to embodiments of the present invention with the fingers. A handle according to some embodiments of the present invention may be operated by a user substantially using gentle motor skill type movements. A handle operated using gentle motor skill type movements may give the user a better control of the operated device when compared to a handle operated using gross motor skill type movements. Therefore, such handle may give mom precise and efficient input to the operated device.

Multiple axis control mechanism according to some embodiments of the present invention may give the user a better and easier control of single lever mixer faucet cartridges in comparison to prior art single lever faucets, for example a faucet as presented in FIG. 1A. Additionally, multiple axis control mechanism according to embodiments of the present invention may enable the user to perform more delicate and precise adjustments to the water flow strength and temperature than is possible by handles that are common today.

Some embodiments of the present invention may give the user the ability to enjoy improved ergonomic qualities and achieve easier and more comfortable control of the faucet, in comparison to prior art single lever faucets. However, the production cost of single lever faucets including a multi axis control mechanism according to some embodiments of the present invention, may very close to producing u standard prior art faucet with a standard handle and cartridge.

Some embodiments of the present invention were described herein mainly with relation to a mechanical control handle and mechanical movement transformation assembly that can manipulate and influence mechanical aspects of the actuated device. However, some embodiments of the present invention are not limited to a mechanical movement transformation assembly and to mechanical actuated device. For example, a multi-axis handle and movement transformation assembly according to some embodiments of the present invention may control the operation of electronic, hydraulic, pneumatic or any other type of technology elements or devices.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A control mechanism for manually adjusting a plurality of control parameters, the control mechanism comprising:
   a mechanical multiple axis handle movable about a plurality of axes of rotation for operating a cartridge of a faucet, wherein at least two of the axes of rotation pass through the handle; and
   a movement transformation assembly configured to transform rotational movements of the handle to control commands to the cartridge;
   wherein the plurality of axes of rotation comprises three axes of rotation, and
   wherein the cartridge comprises:
      a base static plate;
      a movable plate movable over the base static plate, wherein rotating the movable plate over the base static plate sets the first control parameter, and sliding the movable plate over the base static plate sets the second control parameter; and
      a base block fixed to the movable plate;
   wherein the plurality of axes of rotation comprises a first axis of rotation and a second axis of rotation, and
   wherein the movement transformation assembly is configured to transform rotation of the handle about the first axis of rotation to the rotation of the base block that rotates the movable plate, and to transform rotation of handle about the second axis of rotation to sliding of the movable plate over the static plate.

2. The control mechanism of claim 1, wherein the control parameters are independent of each other.

3. The control mechanism of claim 1, wherein the axes of rotation cross through a substantially common point located within the handle.

4. The control mechanism of claim 1, wherein the axes of rotation pass in the middle of a longitudinal dimension of the handle.

5. The control mechanism of claim 1, wherein the axes of rotation pass in the middle of a graspable area of the handle.

6. The control mechanism of claim 1, wherein the axes of rotation are mutually independent.

7. The control mechanism of claim 1, wherein the axes of rotation are substantially perpendicular to each other.

8. The control mechanism of claim 1, wherein the handle extends to both sides of the movement transformation assembly.

9. The control mechanism of claim 1, wherein the movement transformation assembly disposed in a tunnel.

10. The control mechanism of claim 1, wherein the movement transformation assembly coincides with one of the axes of rotation.

11. The control mechanism of claim 1, wherein the movement transformation assembly to transform rotational movements of the handle into a movement type selected from the list consisting of: linear movement, pivotal movement and rotational movement.

12. The control mechanism of claim 1, wherein the cartridge comprises a mechanism to set at least two controlled parameters related to the operation of the faucet.

13. The control mechanism of claim 1, wherein the cartridge comprises at least one mechanism to set the relative mixture of hot and cold water and at least one mechanism to set the overall water flow rate of the faucet.

14. The control mechanism of claim 1, wherein the cartridge comprises:
   a base static plate;
   a movable plate movable over the base static plate; and
   a lever assembly comprising a lever and a base block, operatively connected to the movable plate element, wherein rotating the lever and the base block about a first lever axis of rotation rotates the movable plate over the static plate to set the first control parameter, and tilting the lever about a second lever axis of rotation slides the movable plate over the base static plate to set the second control parameter,
   wherein the plurality of axes of rotation comprises a first axis of rotation and a second axis of rotation, and
   wherein the movement transformation assembly to transform rotation of the handle about the first axis of rotation to the rotation of the base block that rotates the movable plate, and to transform rotation of handle about the second axis of rotation to the tilt of the lever that slides the movable plate over the static plate.

15. The control mechanism of claim 14, wherein the movement transformation assembly comprises:
   a rocker;
   a member to transfer rotational movements of the handle about the first axis of rotation to control commands to the cartridge, the member anchored to the handle and fixed to the base block, the member to rotate the base block when the handle is rotating about the first axis of rotation; and
   an elongated rod to transfer rotational movements of the handle about the second axis of rotation to control commands to the cartridge, the rod anchored at one end to the handle at a distance from the second axis of rotation such that when the handle rotates about the second axis of rotation the elongated rod moves substantially towards or away from the cartridge, and the second end of the rod is anchored to an end of the rocker, the second end of the rocker is anchored to the lever, and the rocker is anchored to the member, such that when the rod moves towards or away from the cartridge the rocker tilts the lever.

16. The control mechanism of claim 1, wherein the movement transformation assembly comprises:
   a rocker;
   a member to transfer rotational movements of the handle about the first axis of rotation to control commands to the cartridge, the member anchored to the handle and fixed to the base block, the member to rotate the base block when the handle is rotating about the first axis of rotation; and
   an elongated rod to transfer rotation movements of the handle about the second axis of rotation to control commands to cartridge, the rod anchored to the handle at a distance from the second axis of rotation such that when the handle rotates about the second axis of rotation the elongated rod moves substantially back and forth relatively to the cartridge, the second end of the rod is anchored to the rocker, the second end of the rocker is anchored to the plate and the rocker is anchored to the member, such that when the rod moves towards or away from the cartridge, the rocker slides the movable plate over the static plate.

* * * * *